United States Patent
Ito et al.

(10) Patent No.: US 11,441,055 B2
(45) Date of Patent: Sep. 13, 2022

(54) ADHESIVE COMPOSITION, AND MATERIAL FOR BATTERY, MATERIAL FOR LITHIUM ION BATTERY, HEAT FUSIBLE MEMBER, AND PACKAGING MATERIAL FOR LITHIUM ION BATTERY, EACH USING THE SAME

(71) Applicant: TOAGOSEI CO., LTD., Tokyo (JP)

(72) Inventors: Takahiro Ito, Nagoya (JP); Makoto Hirakawa, Nagoya (JP); Mitsue Takamura, Tokyo (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 16/960,450

(22) PCT Filed: Jan. 9, 2019

(86) PCT No.: PCT/JP2019/000266
§ 371 (c)(1),
(2) Date: Jul. 7, 2020

(87) PCT Pub. No.: WO2019/139016
PCT Pub. Date: Jul. 18, 2019

(65) Prior Publication Data
US 2020/0339845 A1    Oct. 29, 2020

(30) Foreign Application Priority Data

Jan. 9, 2018    (JP) .............................. JP2018-001168

(51) Int. Cl.
| | | |
|---|---|---|
| *C09J 123/26* | (2006.01) | |
| *B32B 7/12* | (2006.01) | |
| *B32B 15/085* | (2006.01) | |
| *B32B 15/20* | (2006.01) | |
| *B32B 27/32* | (2006.01) | |
| *C09J 11/06* | (2006.01) | |
| *C09J 175/04* | (2006.01) | |
| *H01M 50/116* | (2021.01) | |
| *H01M 50/124* | (2021.01) | |
| *H01M 50/183* | (2021.01) | |

(52) U.S. Cl.
CPC .............. *C09J 123/26* (2013.01); *B32B 7/12* (2013.01); *B32B 15/085* (2013.01); *B32B 15/20* (2013.01); *B32B 27/32* (2013.01); *C09J 11/06* (2013.01); *C09J 175/04* (2013.01); *H01M 50/116* (2021.01); *H01M 50/124* (2021.01); *H01M 50/183* (2021.01); *B32B 2457/10* (2013.01)

(58) Field of Classification Search
CPC ..... B32B 2457/10; B32B 27/32; B32B 37/12; C09J 2203/33; C09J 123/02; C09J 123/025; C09J 123/04; C09J 123/06; C09J 123/08; C09J 123/0807; C09J 123/0815; C09J 123/0823; C09J 123/083; C09J 123/0838; C09J 123/0846; C09J 123/0853; C09J 123/0861; C09J 123/0869; C09J 123/0876; C09J 123/0884; C09J 123/0892; C09J 123/10; C09J 123/12; C09J 123/14; C09J 123/142; C09J 123/145; C09J 123/147; C09J 123/16; C09J 123/18; C09J 123/20; C09J 123/22; C09J 123/24; C09J 123/00; C09J 123/26; C09J 123/28; C09J 123/283; C09J 123/286; C09J 123/30; C09J 123/32; C09J 123/34; C09J 123/36
See application file for complete search history.

(56) References Cited

U.S. PATENT DOCUMENTS

2020/0131413 A1    4/2020    Ito et al.

FOREIGN PATENT DOCUMENTS

| | | | |
|---|---|---|---|
| JP | H 0418480 A | | 1/1992 |
| JP | 09227836 A | * | 9/1997 |
| JP | H 09227836 A | | 9/1997 |
| JP | 2014199761 A | | 10/2014 |
| JP | 2015036385 A | | 2/2015 |
| JP | 2015059182 A | | 3/2015 |
| JP | 2017132894 A | | 8/2017 |
| TW | 201520286 | | 6/2015 |
| WO | WO 2012/035958 A1 | | 3/2012 |
| WO | WO 2015/046378 A1 | | 4/2015 |

OTHER PUBLICATIONS

[NPL-1] Kazuyuki et al. (JP H09-227836 A); Sep. 2, 1997 (JPO machine translation to English). (Year: 1997).*
JPH09227836A English Machine Translation, prepared Sep. 7, 2021. (Year: 2021).*
International Search Report for PCT/JP2019/000266 dated Mar. 26, 2019, 1 page.
Extended European Search Report for corresponding EP Application No. EP 19 73 8960 dated Jan. 29, 2021—7 pages.
Chinese Office Action (w/ English translation) for corresponding CN Application No. CN2019800072284, dated Oct. 11, 2021, 8 pages.

* cited by examiner

*Primary Examiner* — Christopher M Rodd
(74) *Attorney, Agent, or Firm* — Dority & Manning, P.A.

(57) ABSTRACT

Provided is an adhesive composition, including a modified polypropylene-based resin (A) that contains at least one of an acidic group or an acid anhydride group, and that contains a (meth)acryloyl group (a), in which the (meth)acryloyl group (a) is introduced by a modification reaction of at least one of an acidic group or an acid anhydride group of a polypropylene-based resin (h) that contains the at least one of the acidic group or the acid anhydride group.

9 Claims, 1 Drawing Sheet

ADHESIVE COMPOSITION, AND MATERIAL FOR BATTERY, MATERIAL FOR LITHIUM ION BATTERY, HEAT FUSIBLE MEMBER, AND PACKAGING MATERIAL FOR LITHIUM ION BATTERY, EACH USING THE SAME

TECHNICAL FIELD

The present invention relates to an adhesive composition, as well as a material for a battery, a material for a lithium ion battery, a heat fusible member, and a packaging material for a lithium ion battery, each using the same, can be used in the fields of various industrial products, such as the fields of electrical devices, automobiles and industries, and belongs to these technical fields.

BACKGROUND ART

Hot melt adhesive compositions are processed and used in the form of films or sheets, and utilized, as adhesive films or sheets in which the adhesive compositions are layered on the surface of members, in the fields of various industrial products, such as the fields of electrical devices, automobiles and industries.

Various types of adhesive compositions have been proposed, in order to adhere metal members which are made of metals such as iron, aluminum, titanium and other metals, as well as alloys thereof, to molded products composed of polyolefins having poor adhesiveness, which are used in these fields.

Japanese Patent Application Laid-Open (JP-A) No. H4-18480 discloses an adhesive composition obtained by dissolving and dispersing, in an organic solvent, a component composed of a carboxylic acid-containing polyolefin, a carboxylic acid-containing epoxy resin, a polyisocyanate compound, and an optional epoxy resin.

JP-A No. 2015-36385 discloses an adhesive composition which contains a polyolefin containing a carboxyl group or an acid anhydride group, a polyfunctional isocyanate compound and contains a solvent, and in which the polyolefin has specific values of glass transition temperature, melting point, and energy of fusion.

SUMMARY OF THE INVENTION

Technical Problem

However, although each of the adhesive compositions disclosed in JP-A No. H4-18480 and JP-A No. 2015-36385 enables to provide a heat fusible member having a high peel strength at normal temperature, each of the compositions shows a slow rise in the peel strength immediately after lamination. As a result, when the laminated heat fusible member is wound in a form of roll, there has been a problem that the displacement of laminating position, or wrinkles may occur due to tightening by winding.

An object of one embodiment of the present invention is to provide an adhesive composition which enables to suppress the displacement of the position or the occurrence of wrinkles after lamination, due its excellent rise in the peel strength immediately after lamination, and which can be used as a material for a battery, particularly, as a packaging material for a lithium battery, due to having a high peel strength at a high temperature (80° C.) and an excellent electrolyte resistance.

Solution to Problem

As a result of intensive studies to solve the above mentioned problems, the present inventors have found that these problems can be solved by an adhesive composition containing a curable resin that is cured by a radical reaction of a (meth)acryloyl group, which is added, by various methods, to a polypropylene-based resin that contains at least one of an acidic group or an acid anhydride group, thereby completing the present invention. Further, the present inventors have found that the adhesive composition has a high peel strength at a high temperature and an excellent electrolyte resistance, and thus can be favorably used as a material for a battery, particularly, as a packaging material for a lithium ion battery, thereby completing the present invention.

The present invention includes the following embodiments.

[1] An adhesive composition, including a modified polypropylene-based resin (A) that contains at least one of an acidic group or an acid anhydride group, and that contains a (meth)acryloyl group (a) represented by the following Formula (I), in which the (meth)acryloyl group (a) is introduced by a modification reaction of at least one of an acidic group or an acid anhydride group of a polypropylene-based resin (b) that contains the at least one of the acidic group or the acid anhydride group:

$$CH_2=CR^1CO— \quad (I)$$

in which, in Formula (I), $R^1$ represents a hydrogen atom or a methyl group.

[2] The adhesive composition according to [1], in which the (meth)acryloyl group (a) is introduced by a reaction of at least one of the acidic group or the acid anhydride group of the polypropylene-based resin (b) with a compound represented by the following Formula (II):

$$CH_2=CR^2CO—R^3—OH \quad (II)$$

in which, in Formula (II), $R^2$ represents a hydrogen atom or a CH$_3$ group; $R^3$ represents a —(OCH$_2$CH$_2$)$_n$— group, in which n represents an integer from 1 to 8, a —(OCH$_2$CH(CH$_3$))$_n$— group, in which n represents an integer from 1 to 8, a —(OCH$_2$CH$_2$CH(CH$_3$))$_n$— group, in which n represents an integer from 1 to 8, a —(O(CH$_2$)$_4$)$_n$— group, in which n represents an integer from 1 to 8, a —(OCH$_2$CH(CH$_2$CH$_3$))$_n$— group, in which n represents an integer from 1 to 8, or an —NH—CH$_2$— group.

[3] The adhesive composition according to [1], in which the (meth)acryloyl group (a) is introduced by a reaction of at least one of the acidic group or the acid anhydride group of the polypropylene-based resin (b) with a compound represented by the following Formula (III):

$$CH_2=CR^4CO—R^5—NCO \quad (III)$$

in which, in Formula (III), $R^4$ represents a hydrogen atom or a CH$_3$ group; $R^5$ represents a —(OCH$_2$CH$_2$)$_n$— group, in which n represents an integer from 1 to 8, a —(OCH$_2$CH(CH$_3$))$_n$— group, in which n represents an integer from 1 to 8, or an —NH—CH$_2$— group.

[4] The adhesive composition according to [1], in which the (meth)acryloyl group (a) is introduced by a reaction of at least one of the acidic group or the acid anhydride group of the polypropylene-based resin (b) with a compound represented by the following Formula (IV):

$$CH_2=CR^6CO—R^7—OR^{10} \quad (IV)$$

in which, in Formula (IV), $R^6$ represents a hydrogen atom or a CH$_3$ group; $R^7$ represents a single bond, a —$(OCH_2CH_2)_n$— group, in which n represents an integer from 1 to 8, a —$(OCH_2CH_3)_n$— group, in which n represents an integer from 1 to 8, or an —$NH$—$CH_2$— group; and $R^{10}$ represents a glycidyl group.

[5] The adhesive composition according to [1], in which the (meth)acryloyl group (a) is introduced by a reaction of:
at least one of a hydroxyl group or a carboxy group, which is produced by a reaction of at least one of the acidic group or the acid anhydride group of the polypropylene-based resin (b) with at least one of a compound represented by the following Formula (V) or a compound represented by the following Formula (VI), with
a compound represented by the following Formula (VII):

$$H_2N—(CH_2)_n—OH \quad (V)$$

in which, in Formula (V), n represents an integer from 1 to 8;

$$HO—(CH_2)_n—NH—(CH_2)_m-OH \quad (VI)$$

in which, in Formula (VI), each of m and n independently represents an integer from 1 to 8;

$$CH_2=CR^8CO—R^9—NCO \quad (VII)$$

in which, in Formula (VII), $R^5$ represents a hydrogen atom or a $CH_3$ group; $R^9$ represents a —$(OCH_2CH_2)_n$— group, in which n represents an integer from 1 to 8, a —$(OCH_2CH(CH_3))_n$— group, in which n represents an integer from 1 to 8, or an —$NH$—$CH_2$— group.

[6] The adhesive composition according to any one of [1] to [5], further including a radical polymerization initiator.

[7] The adhesive composition according to any one of [1] to [6], further including an organic solvent, in which the modified polypropylene-based resin (A) is dissolved in the organic solvent.

[8] The adhesive composition according to any one of [1] to [7], further including an isocyanate compound.

[9] A material for a battery, the material including a cured product of the adhesive composition according to any one of [1] to [8].

[10] A material for a lithium ion battery, the material including a cured product of the adhesive composition according to any one of [1] to [8].

[11] A heat fusible member including:
an adhesive layer that is a cured product of the adhesive composition according to any one of to [8];
a metal layer bonded to one surface of the adhesive layer; and
a heat fusible resin layer bonded to another surface of the adhesive layer.

[12] A packaging material for a lithium ion battery, including the heat fusible member according to [11].

Advantageous Effects of Invention

An adhesive composition according to the present disclosure enables to solve the problem of the displacement of laminating position or the occurrence of wrinkles due to tightening by winding or the like of a resulting heat fusible member, since the adhesive composition shows an excellent rise in the peel strength immediately after lamination. Further, a heat fusible member using the adhesive composition according to the present disclosure has a high peel strength at a high temperature (80° C.) and an excellent electrolyte resistance, and thus can be favorably used as a material for a battery, particularly, as a packaging material for a lithium ion battery. Furthermore, the adhesive composition according to the present disclosure requires a shorter aging period, as compared to a conventional adhesive using an isocyanate-based curing agent.

DESCRIPTION OF EMBODIMENTS

1. Adhesive Composition

Figure 1:
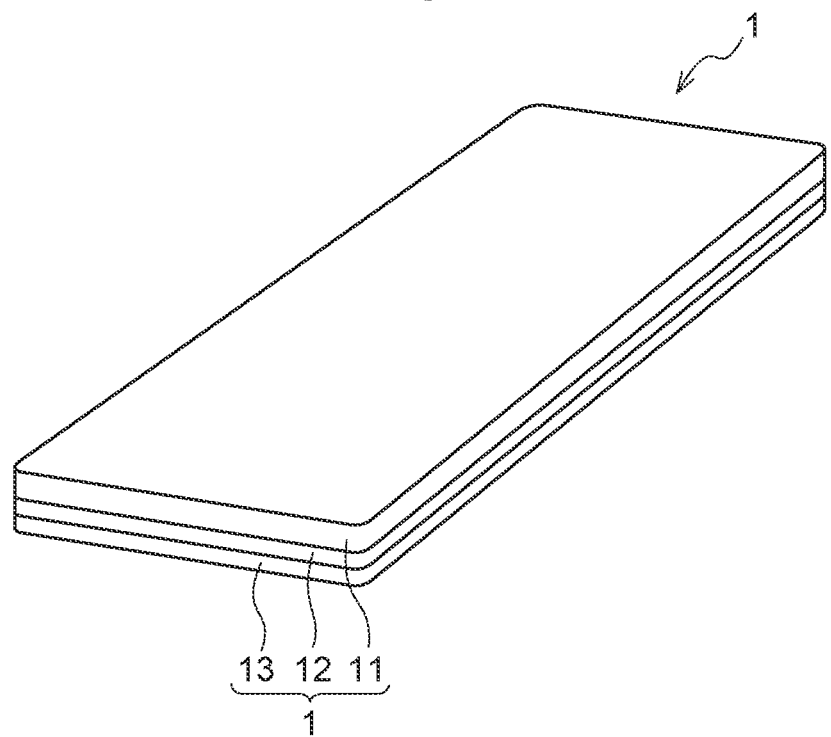
FIG. 1 is a schematic perspective view showing one example of the heat fusible member according to the present disclosure.

The first aspect of the present invention (an adhesive composition according to the present disclosure) is an adhesive composition, including a modified polypropylene-based resin (A) that contains at least one of an acidic group or an acid anhydride group, and that contains a (meth)acryloyl group (a) represented by the following Formula (I), in which the (meth)acryloyl group (a) is introduced by a modification reaction of at least one of an acidic group or an acid anhydride group of a polypropylene-based resin (b) that contains at least one of the acidic group or the acid anhydride group:

$$CH_2=CR^1CO— \quad (I)$$

in which, in Formula (I), $R^1$ represents a hydrogen atom or a methyl group.

The modified polypropylene-based resin (A) (hereinafter, also referred to as "component (A)") contained in the adhesive composition according to the present disclosure, and other components which may be contained in the adhesive composition according to the present disclosure will be described below.

It is noted, in the present specification, that the term "(meth)acrylic acid" is used to collectively represent an acrylic acid and a methacrylic acid, and the term "(meth)acryloyl group" is used to collectively represent an acryloyl group and a methacryloyl group.

1-1. Modified Polypropylene-Based Resin (A)

The component (A) contains at least one of an acidic group or an acid anhydride group, and that contains a (meth)acryloyl group (a) represented by the following Formula (I), in which the (meth)acryloyl group (a) is introduced by a modification reaction of at least one of an acidic group or an acid anhydride group of a polypropylene-based resin (b) that contains at least one of the acidic group or the acid anhydride group:

$$CH_2=CR^1CO— \quad (I)$$

in which, in Formula (I), $R^1$ represents a hydrogen atom or a methyl group.

The adhesive composition according to the present disclosure contains the component (A) having the above described structure, by which it is possible to enhance the peel strength at normal temperature (25° C.) and the peel strength at a high temperature. Further, it is also possible to speed up the rise in the peel strength after lamination, and to achieve excellent adhesiveness even in a short aging time.

1-1-1. Polypropylene-based Resin (b) Containing At Least One of Acidic Group or Acid Anhydride Group At least one of the acidic group or the acid anhydride group contained in the component (A) is derived from at least one of the acidic group or the acid anhydride group contained in the polypropylene-based resin (h).

Specific examples of a structural unit of the polypropylene-based resin (b) include: a structural unit derived from ethylene and a structural unit derived from propylene; as well as a structural unit derived from an α-olefin, such as a structural unit derived from 1-butene, a structural unit derived from isobutylene, a structural unit derived from 1-hexene, and a structural unit derived from 1-octene. Among these, a structural unit derived from ethylene, a structural unit derived from propylene, or a structural unit derived from 1-butene is preferred when a poorly adhesive non-polar polyolefin resin, such as crystalline polyethylene or polypropylene, is used as an adherent, from the viewpoint that the peel strength at a high temperature and the electrolyte resistance can be improved.

Specific examples of the acidic group include a carboxylic acid group, a sulfonic acid group, and a phosphoric acid group. Among these, a carboxylic acid group is preferred from the viewpoint of facilitating the modification.

Specific examples of the acid anhydride group include a carboxylic anhydride group, a sulfonic anhydride group, and a phosphoric anhydride group. Among these, a carboxylic anhydride group is preferred from the viewpoint of facilitating the modification.

The polypropylene-based resin (b) containing at least one of an acidic group or an acid anhydride group is preferably a resultant obtained by modifying an unmodified polypropylene-based resin with at least one of an acidic group-containing monomer or an acid anhydride group-containing monomer.

1-1-1-1. Acidic Group-Containing Monomer

The acidic group-containing monomer, which is a raw material of the component (A), may be, for example, a compound containing an ethylenic double bond, a carboxylic acid group and the like, within the same molecule. Specific examples thereof include α, β-unsaturated carboxylic acid compounds, such as various types of unsaturated monocarboxylic acid compounds, unsaturated dicarboxylic acid compounds, and unsaturated tricarboxylic acid compounds.

Specific examples of the unsaturated monocarboxylic acid compounds include acrylic acid, methacrylic acid, crotonic acid, and isocrotonic acid.

Specific examples of the unsaturated dicarboxylic acid compounds include maleic acid, itaconic acid, citraconic acid, tetrahydrophthalic acid, nadic acid, and endic acid.

Examples of the unsaturated tricarboxylic acid compounds include aconitic acid.

The acidic group-containing monomer is preferably an unsaturated dicarboxylic acid compound or an unsaturated tricarboxylic acid compound, and more preferably itaconic acid, maleic acid, or aconitic acid, from the viewpoint of facilitating the modification and obtaining excellent adhesiveness.

These acidic group-containing monomers may be used singly, or in combination of two or more kinds thereof.

When the acidic group-containing monomer used for the modification is partially unreacted, it is preferred to use, as the polypropylene-based resin (b), a resultant from which the unreacted acidic group-containing monomer has been removed by a known method, such as distillation under heating and reduced pressure, or purification by reprecipitation, in order to prevent adverse effects on adhesive strength.

When the polypropylene-based resin (b) is a polypropylene-based resin graft-modified with an acidic group-containing monomer, the graft amount of the acidic group-containing monomer in the component (A) is preferably from 0.10% by mass to 30% by mass with respect to the total mass of the component (A). The graft amount of the acidic group-containing monomer is preferably 0.10% by mass or more, and more preferably 0.50% by mass or more, from the viewpoint that it allows for maintaining solubility in a solvent and adhesiveness to a material such as a metal adherend. Further, the graft amount of the acidic group-containing monomer is preferably 30% by mass or less, more preferably 20% by mass or less, and still more preferably 10% by mass or less, from the viewpoint that sufficient adhesiveness can be obtained.

The graft amount of the acidic group-containing monomer can be measured by a known method. For example, the graft amount can be determined by an alkali titration method.

1-1-1-2. Acid Anhydride Group-Containing Monomer

The acid anhydride group-containing monomer, which is a raw material of the component (A), may be, for example, a compound containing an ethylenic double bond, a carboxylic anhydride group and the like, within the same molecule. Specific examples thereof include derivatives of α, β-unsaturated carboxylic acid compounds, such as acid anhydrides of the unsaturated monocarboxylic acid compounds described above, acid anhydrides of the unsaturated dicarboxylic acid compounds described above, and acid anhydrides of the unsaturated tricarboxylic acid compounds described above.

Specific examples of acid anhydrides of the unsaturated monocarboxylic acid compounds include acrylic anhydride, methacrylic anhydride, crotonic anhydride and isocrotonic anhydride.

Specific examples of acid anhydrides of the unsaturated dicarboxylic acid compounds include maleic anhydride, itaconic anhydride, citraconic anhydride, tetrahydrophthalic anhydride, roadie anhydride and endic anhydride.

Specific examples of acid anhydrides of the unsaturated tricarboxylic acid compounds include aconitic anhydride.

The acid anhydride group-containing monomer is preferably an acid anhydride of an unsaturated dicarboxylic acid compound or an acid anhydride of an unsaturated tricarboxylic acid compound, and more preferably itaconic anhydride, maleic anhydride, or aconitic anhydride, from the viewpoint of facilitating the modification and obtaining excellent adhesiveness.

These acid anhydride group-containing monomers may be used singly, or in combination of two or more kinds thereof.

When the acid anhydride group-containing monomer used for the modification is partially unreacted, it is preferred to use, as the polypropylene-based resin (b), a resultant from which the unreacted acid anhydride group-containing monomer has been removed by a known method, such as distillation under heating, or purification by reprecipitation, in order to prevent adverse effects on the adhesive strength.

When the polypropylene-based resin (b) is a polypropylene-based resin graft-modified with an acid anhydride group-containing monomer, the graft amount of the acid anhydride group-containing monomer in the component (A) is preferably from 0.10% by mass to 30% by mass with respect to the total mass of the component (A). The graft amount of the acid anhydride group-containing monomer is preferably 0.10% by mass or more, and more preferably 0.50% by mass or more, from the viewpoint that it allows for maintaining the solubility in a solvent and the adhesiveness to a material such as a metal adherend. Further, the graft amount of the acid anhydride group-containing monomer is preferably 30% by mass or less, more preferably 20% by mass or less, and still more preferably 10% by mass or less, from the viewpoint that sufficient adhesiveness can be obtained.

The graft amount of the acid anhydride group-containing monomer can be measured by a known method. For example, the graft amount can be determined by an alkali titration method.

The modification using the at least one of the acidic group-containing monomer or the acid anhydride group-containing monomer can be carried out using a known method. Examples of the method include: a graft-modification method in which an addition reaction of the at least one of the acidic group-containing monomer or the acid anhydride group-containing monomer to an unmodified polypropylene-based resin is carried out by melt-blending or in an organic solvent, in the presence of a known radical polymerization initiator such as an organic peroxide or an aliphatic azo compound; and a method in which the copolymerization of the at least one of the acidic group-containing monomer or the acid anhydride group-containing monomer with an unmodified polypropylene-based resin is carried out by melt-blending or in an organic solvent, in the presence of a known radical polymerization initiator such as an organic peroxide or an aliphatic azo compound.

1-1-2. (Meth)acrylic Acid Alkyl Ester

The component (A) may further be graft-modified with a (meth)acrylic acid alkyl ester. When the component (A) is graft-modified with a (meth)acrylic acid alkyl ester, an excellent solubility in an organic solvent and compatibility with another resin can be obtained. The (meth)acrylic acid alkyl ester is preferably an esterification product (hereinafter, referred to as "(meth)acrylic acid long-chain alkyl ester") of an alkyl alcohol having 8 to 18 carbon atoms with (meth)acrylic acid.

Specific examples of the (meth)acrylic acid long-chain alkyl ester, which is a raw material of the component (A), include octyl (meth)acrylate, laurel (meth)acrylate, tridecyl (meth)acrylate, and stearyl (meth)acrylate. Among these, the (meth)acrylic acid long-chain alkyl ester is preferably octyl (meth)acrylate, lauryl (meth)acylate, or tridecyl (meth)acrylate, from the viewpoint that it allows for improving the adhesiveness when a poorly adhesive non-polar polyolefin resin is used as an adherend.

The graft amount of the (meth)acrylic acid alkyl ester in the component (A) is preferably from 0.10% by mass to 20% by mass with respect to the total mass of the component (A). The graft amount of the (meth)acrylic acid alkyl ester is preferably 0 . . . 10% by mass or more, from the viewpoint that the solubility of the component (A) in a solvent, the compatibility with another resin, and the adhesiveness can be favorably maintained. Further, the graft amount of the (meth)acrylic acid alkyl ester is preferably 20% by mass or less, more preferably 10% by mass or less, and still more preferably 5.0% by mass or less, from the viewpoint that the adhesiveness can be favorably maintained.

The graft amount of the (meth)acrylic acid alkyl ester can be measured by a known method. For example, the graft amount of the (meth)acrylic acid alkyl ester can be determined by Fourier-transform infrared spectroscopy.

The (meth)acrylic acid alkyl ester is introduced into the component (A), by being grafted to the polypropylene-based resin (b) containing at least one of an acidic group or an acid anhydride group, in advance.

When it is intended to increase, in the component (A), the graft amount of the acidic group-containing monomer, the graft amount of the acid anhydride group-containing monomer, and the graft amount of the (meth)acrylic acid alkyl ester, the unmodified polypropylene-based resin as a raw material may be, for example, polyethylene, polypropylene, a random copolymer of propylene and ethylene, a block copolymer of propylene and ethylene, a random copolymer of ethylene and an α-olefin, a block copolymer of ethylene and an αolefin, a random copolymer of propylene and an α-olefin, or a block copolymer of propylene and an αolefin.

Among these, a polypropylene-based polymer, such as a propylene-ethylene copolymer, a propylene-1-butene copolymer, or a propylene-ethylene-1-butene copolymer, is preferred when a poorly adhesive non-polar polyolefin resin, such as crystalline polyethylene or polypropylene, is used as an adherend, from the viewpoint that the peel strength at a high temperature and the electrolyte resistance can be improved. Further, the amount of propylene units in the polypropylene-based resin is preferably 50% by mass or more.

In order to improve, in the component (A), the graft amount of the acidic group-containing monomer, the graft amount of the acid anhydride group-containing monomer, and the graft amount of the (meth)acrylic acid alkyl ester, it is preferred to use an organic peroxide, such as benzoyl peroxide, dicumyl peroxide, lauroyl peroxide, di-t-butyl peroxide, 2,5-dimethyl-2,5-di(t-butylperoxy)hexane, or cumene hydroperoxide. Further, a stabilizer for adjusting the resin stability, and a reaction aid may be used.

Specific examples of the reaction aid include styrene, o-methylstyrene, p-methylstyrene, α-methylstyrene, divinylbenzene, hexadiene, and dicyclopentadiene.

Specific examples of the stabilizer include hydroquinone, benzoquinone, and a nitrosophenylhydroxy compound.

Depending on the purpose, a monomer (hereinafter, referred to as "other monomer") that is other than the acidic group-containing monomer, the acid anhydride group-containing monomer, and the (meth)acrylic acid alkyl ester may be used in combination, as long as the properties of the adhesive composition according to the present disclosure are not impaired.

Specific examples of the other monomer include: a (meth)acrylic acid ester other than those mentioned above, such as hydroxyethyl (meth)acrylate, benzyl (meth)acrylate, glycidyl (meth)acrylate, and an isocyanate group-containing (meth)acrylic acid; and an unsaturated monomer copolymerizable with olefins, such as styrene, cyclohexyl vinyl ether, and dicyclopentadiene.

By using the other monomer in combination, it is possible to further improve the adhesiveness and the solubility in a solvent, as well as at least one of the graft amount of the acidic group-containing monomer or the graft amount of the acid anhydride group-containing monomer, and the graft amount of the (meth)acrylic acid alkyl ester. It is desired that the other monomer is used in an amount not more than the total amount of at least one of the graft amount of the acidic group-containing monomer or the graft amount of the acid anhydride group-containing monomer, and the graft amount of the (meth)acrylic acid alkyl ester.

1-1-3. (Meth)acryloyl Group

As described above, the component (A) contains a meth acryloyl group (a) represented by the following Formula (I), in which the (meth)acryloyl group (a) is introduced by a modification reaction of at least one of an acidic group or an acid anhydride group of a polypropylene-based resin (b) that contains at least one of the acidic group or the acid anhydride group:

            (I)

in which, in Formula (I), $R^1$ represents a hydrogen atom or a methyl group.

Examples of the method of introducing the (meth)acryloyl group (a) by a modification reaction of at least one of the acidic group or the acid anhydride group of the polypropylene-based resin (b) include a method in which a (meth)acryloyl derivative containing a functional group that reacts with at least one of an acidic group or an acid anhydride group, which is to be described later, is allowed to react with at least one of the acidic group or the acid anhydride group of the polypropylene-based resin (b), while melt-blending the polypropylene-based resin (b) or in an organic solvent.

1-1-3-1. (Meth)acryloyl Derivative

The (meth)acryloyl derivative, which is a raw material of the component (A), is a compound containing a functional group that reacts with at least one of an acidic group or an acid anhydride group. Specific examples of the (meth)acryloyl derivative include 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, glycidyl (meth)acrylate, and 2-isocyanate ethyl (meth)acrylate.

Examples of the functional group that reacts with at least one of an acidic group or an acid anhydride group include a hydroxyl group, a glycidyl group, and an isocyanate group. It is also possible to subject an acid anhydride group to ring-opening with water or an amine compound, such as monoethanolamine or diethanolamine, to produce at least one of a hydroxyl group or a carboxy group, and then to allow the resulting group to react with a (meth)acryloyl derivative containing a hydroxyl group, a glycidyl group, an isocyanate group or the like.

The reaction of at least one of an acidic group or an acid anhydride group with the (meth)acryloyl derivative containing a hydroxyl group, a glycidyl group, an isocyanate group or the like, may be promoted by the addition of a tertiary amine such as triethylamine or 1,8-diazabicyclo[5.4.0]-7-undecene, triphenylphosphine, paratoluenesulfonic acid, dibutyl tin dilaurate, or the like.

When at least one of an acidic group or an acid anhydride group is allowed to react with the (meth)acryloyl derivative containing a hydroxyl group, a glycidyl group, an isocyanate group or the like, it is possible to add, in an appropriate amount, a polymerization inhibitor, such as hydroquinone, benzoquinone, a nitrosophenylhydroxy compound, methoquinone or hydroquinone monomethyl ether, for the purpose of suppressing the reaction of the (meth)acryloyl group.

In one embodiment of the present invention, the (meth)acryloyl group (a) is introduced by a reaction of at least one of the acidic group or the acid anhydride group of the polypropylene-based resin (b), with a compound ((meth)acryloyl derivative) represented by the following Formula (II):

$$CH_2=CR^2CO-R^3-OH \qquad (II)$$

in which, in Formula (II), $R^2$ represents a hydrogen atom or a $CH_3$ group; $R^3$ represents a $-(OCH_2CH_2)_n-$ group, in which n represents an integer from 1 to 8, a $-(OCH_2CH(CH_3))_n-$ group, in which n represents an integer from 1 to 8, a $-(OCH_2CH(CH_3))_n-$ group, in which n represents an integer from 1 to 8, a $-(O(CH_2)_4)_n-$ group, in which n represents an integer from 1 to 8, a $-(OCH_2CH(CH_2CH_3))_n-$ group, in which n represents an integer from 1 to 8, or an $-NH-CH_2-$ group.

Further, in one embodiment of the present invention, the (meth)acryloyl group (a) is introduced by a reaction of at least one of the acidic group or the acid anhydride group of the polypropylene-based resin (b), with a compound ((meth)acryloyl derivative) represented by the following Formula (III):

$$CH_2=CR^4CO-R^5-NCO \qquad (III)$$

in which, in Formula (III), $R^4$ represents a hydrogen atom or a $CH_3$ group; $R^5$ represents a $-(OCH_2CH_2)_n-$ group, in which n represents an integer from 1 to 8, a $-(OCH_2CH(CH_3))_n-$ group, in which n represents an integer from 1 to 8, or an $-NH-CH_2-$ group.

Still further, in one embodiment of the present invention, the (meth)acryloyl group (a) is introduced by a reaction of at least one of the acidic group or the acid anhydride group of the polypropylene-based resin (h), with a compound ((meth)acryloyl derivative) represented by the following Formula (IV):

$$CH_2=CR^6CO-R^7-OR^{10} \qquad (IV)$$

in which, in Formula (IV), $R^6$ represents a hydrogen atom or a $CH_3$ group; $R^7$ represents a single bond, a $-(OCH_2CH_2)_n-$ group, in which n represents an integer from 1 to 8, a $-(OCH_2CH(CH_3))_n-$ group, in which n represents an integer from 1 to 8, or an $-NH-CH_2-$ group; and $R^{10}$ represents a glycidyl group.

Still further, in one embodiment of the present invention, the (meth)acryloyl group (a) is introduced by a reaction of:
at least one of a hydroxyl group or a carboxy group, which is produced by a reaction of at least one of the acidic group or the acid anhydride group of the polypropylene-based resin (b) with at least one of a compound represented by the following Formula (V) or a compound represented by the following Formula (VI), with
a compound represented by the following Formula (VII):

$$H_2N-(CH_2)_n-OH \qquad (V)$$

in which, in Formula (V), n represents an integer from 1 to 8;

$$HO-(CH_2)_n-NH-(CH_2)_m-OH \qquad (VI)$$

in which, in Formula (VI), each of m and n independently represents an integer from 1 to 8;

$$CH_2=CR^8CO-R^9-NCO \qquad (VII)$$

in which, in Formula (VII), $R^8$ represents a hydrogen atom or a $CH_3$ group; $R^9$ represents a $-(OCH_2CH_2)_n-$ group, in which n represents an integer from 1 to 8, a $-(OCH_2CH(CH_3))_n-$ group, in which n represents an integer from 1 to 8, or an $-NH-CH_2-$ group.

The content of the (meth)acryloyl group in the component (A) is preferably from 0.10% by mass to 30% by mass with respect to the total mass of the component (A). The content of the (meth)acryloyl group is preferably 0.10% by mass or more, from the viewpoint that a high peel strength at normal temperature and a high peel strength at a high temperature can be obtained, and also from the viewpoint that the electrolyte resistance and the adhesiveness to another resin can be favorably maintained, when used as a packaging material for a lithium ion battery. Further, the content of the (meth)acryloyl group is preferably 30% by mass or less, more preferably 20% by mass or less, and still more preferably 10% by mass or less, from the viewpoint that the adhesiveness can be favorably maintained.

The average number of functional groups of the (meth)acryloyl group in the component (A) is preferably from 0.1 to 200. The average number of functional groups is preferably 0.1 or more, from the viewpoint that a high peel strength at normal temperature and a high peel strength at a high temperature can be obtained, and also from the viewpoint that the electrolyte resistance and the adhesiveness to another resin can be favorably maintained, when used as a packaging material for a lithium ion battery. Further, the average number of functional groups is preferably 200 or less, more preferably 160 or less, and still more preferably 120 or less, from the viewpoint that it allows for a stable production and enables to maintain solution stability.

The content and the average number of functional groups of the (meth)acryloyl group can be measured by a known method, respectively. For example, the content and the average number of functional groups can be determined using an $^1$H-NMR analyzer, respectively.

The component (A) preferably has a weight average molecular weight of from 15,000 to 200,000. The weight average molecular weight of the component (A) is preferably 15,000 or more, and more preferably 30,000 or more, from the viewpoint that the peel strength at normal temperature and the electrolyte resistance can be improved. Further, the weight average molecular weight of the component (A) is preferably 200,000 or less, and more preferably 180,000 or less, from the viewpoint that the solubility in an organic solvent contained in the adhesive composition can be improved.

In the present disclosure, the "weight average molecular weight" refers to a value of the molecular weight measured by gel permeation chromatography and calculated in terms of polystyrene.

The component (A) preferably has a glass transition temperature of from −30° C. to 10° C., from the viewpoint that a sufficient peel strength can be obtained within a range of from a low temperature (−40° C.) to room temperature (25° C.).

The glass transition temperature of the component (A) is measured as follows. The measurement is carried out in accordance with JIS K 7121 (established in 1987), using a differential scanning calorimeter (DSC (differential scanning calorimetry) apparatus). A test piece is placed in a container in the DSC apparatus, and the container is maintained at 150° C. for 10 minutes, followed by rapidly cooling to −100° C. After maintaining the temperature at −100° C. for 10 minutes, the test piece is heated to 60° C. at a rate of 20° C./min, so as to obtain a DSC curve.

The temperature at the intersection of a straight line obtained by extending a base line on a low temperature side to a high temperature side, with a tangential line drawn at a point at which the slope of the curve of step-like changes in the glass transition is maximized, is defined as the glass transition temperature.

The component (A) preferably has a melting point of from 50° C. to 120° C. The melting point of the component (A) is preferably 50° C. or higher, and more preferably 60° C. or higher, from the viewpoint that a sufficient peel strength can be obtained. Further, the melting point of the component (A) is preferably 110° C. or lower, and more preferably 100° C. or lower, from the viewpoint that a sufficient storage stability at a low temperature can be obtained.

The melting point of the component (A) is measured as follows.

The measurement is carried out in accordance with JIS K 7121 (established in 1987), using a differential scanning calorimeter at a temperature rise rate of 10° C./min, and the temperature at which the component (A) crystalizes is defined as the melting point (hereinafter, referred to as "Tm").

The component (A) preferably has an energy of fusion, as measured in accordance with JIS K7122, of from 15 (mJ/mg) to 50 (mJ/mg). When the energy of fusion is 50 mJ/mg or less, an excellent solubility in an organic solvent can be obtained. When the energy of fusion is 15 mJ/mg or more, the resulting adhesive composition has adhesion durability, such as electrolyte resistance.

The adhesive composition according to the present disclosure may contain only one kind of the component (A), or two or more kinds thereof.

The content of the component (A) is preferably from 80% by mass to 100% by mass, and more preferably from 90% by mass to 100% by mass, with respect to 100% by mass of the solid content of the adhesive composition, from the viewpoint of achieving an excellent peel strength at a high temperature and electrolyte resistance.

1-2. Radical Polymerization Initiator

It is preferred that the adhesive composition according to the present disclosure further contains a radical polymerization initiator.

The radical polymerization initiator which may be contained in the adhesive composition according to the present disclosure is, for example, at least one of a thermal radical polymerization initiator, or a photoradical polymerization initiator that generates radicals by an active energy ray. From the viewpoint of ease of curing and cost, the adhesive composition preferably contains a photoradical polymerization initiator that generates radicals by an active energy ray.

1-2-1. Thermal Radical Polymerization Initiator

Examples of the thermal radical polymerization initiator include a peroxide, an azo compound, and a redox initiator, each of which generates radicals by heating.

Examples of the azo compound include azobisisobutyronitrile, azobis-2,4-dimethylvaleronitrile, azobiscyclohexanecarbonitrile, and azobis-4-methoxy-2,4-dimethylvaleronitrile.

Examples of the peroxide include benzoyl peroxide, lauroyl peroxide, cumene hydroperoxide, t-butyl hydroperoxide, t-hexyl peroxypivalate, dilauroyl peroxide, dilauroyl peroxide, di(2-ethylhexyl) peroxydicarbonate, di-t-butyl peroxide, and dicumyl peroxide.

Examples of the redox initiator include hydrogen peroxide-iron (11) salt, peroxodisulfate-sodium hydrogen sulfite, and cumene hydroperoxide-iron (II) salt.

The usage ratio of the thermal radical polymerization initiator is preferably from 0.1 parts by mass to 10 parts by mass with respect to 100 parts by mass of the total amount of the curable component.

In the present disclosure, the "curable component" refers to the modified polypropylene-based resin (A) containing the (meth)acryloyl group (a), 1-2-2. Photoradical Polymerization Initiator The photoradical polymerization initiator generates radicals by an active energy ray, such as an ultraviolet ray, a visible ray, or an electron beam.

When an electron beam is used as the active energy ray, it is possible to cure the adhesive composition according to the present disclosure without containing a photoradical polymerization initiator. However, the adhesive composition may contain a small amount of a photoradical polymerization initiator, if necessary, in order to improve curability.

Specific examples of the photoradical polymerization initiator include:

acetophenone-based compounds such as benzyl dimethyl ketal, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, oligo[2-hydroxy-2-methyl-1-[4-(1-methylvinyl)phenyl]propanone], 2-hydroxy-1-[4-[4-(2-hydroxy-2-methyl-propionyl)benzyl]phenyl]-2-methylpropan-1-one, 2-methyl-1-[4-(methylthio)

phenyl]-2-morpholinopropane-1-one, 2-benzyl-2-dimethylamino-1-(4-morpholinophenyl)butan-1-one, 2-dimethylamino-2-(4-methylbenzyl)-1-(4-morpholin-4-yl-phenyl)butan-1-one, and 3,6-bis(2-methyl-2-morpholinopropionyl)-9-n-octylcarbazole;

benzoin-based compounds such as benzoin, benzoin ethyl ether, benzoin isopropyl ether, and benzoin isobutyl ether;

benzophenone-based compounds such as benzophenone, 2-methylbenzophenone, 3-methylbenzophenone, 4-methylbenzophenone, 2,4,6-trimethylbenzophenone, 4-phenylbenzophenone, methyl-2-benzophenone, 1-[4-(4-benzoylphenylsulfanyl)phenyl]-2-methyl-2-(4-methylphenyl sulfonyl)propan-1-one, 4,4'-bis(dimethylamino)benzophenone, 4,4'-bis(diethylamino)benzophenone, and 4-methoxy-4'-dimethylaminobenzophenone;

acylphosphine oxide-based compounds such as bis(2,4,6-trimethylbenzoyl)phenylphosphine oxide, 2,4,6-trimethylbenzoyldiphenylphosphine oxide, and bis(2,6-dimethoxybenzoyl)-2,4,4-trimethylpentyl phosphine oxide; and thioxanthone-based compounds such as thioxanthone, 2-chlorothioxanthone, 2,4-diethylthioxanthone, isopropylthioxamhone, 1-chloro-4-propylthioxanthone, 3-[3,4-dimethyl-9-oxo-9H-thioxanthon-2-yl-oxy]-2-hydroxypropyl-N,N,N-trimethylammonium chloride, and fluorothioxanthone.

Examples of compounds other than those mentioned above include benzyl, ethyl(2,4,6-trimethylbenzoyl)phenylphosphinate, methyl phenylglyoxylate, ethylanthraquinone, phenanthrenequinone and camphorquinone.

Among these compounds, the adhesive composition preferably contains an acylphosphine oxide-based compound as the photoradical polymerization initiator, from the viewpoint that the resulting composition has an excellent curability, and the resulting cured product has excellent low yellowing properties.

The content ratio of the photoradical polymerization initiator is preferably from 0.1 parts by mass to 15 parts by mass, and more preferably from 0.5 parts by mass to 10 parts by mass, with respect to 100 parts by mass of the total amount of the curable component. When the content ratio of the photoradical polymerization initiator is 0.1 parts by mass or more, the resulting adhesive composition can have a favorable photocurablility and excellent adhesiveness. When the content ratio of the photoradical polymerization initiator is 15 parts by mass or less, the resulting cured product can have a favorable internal curability and a favorable adhesiveness to a substrate.

1-3, Isocyanate Compound

It is preferred that the adhesive composition according to the present disclosure further contains an isocyanate compound, from the viewpoint of improving the heat resistance of the resulting cured product or further improving the peel strength at a high temperature of the member obtained by adhesion.

The isocyanate compound to be used in the adhesive composition according to the present disclosure is not particularly limited, as long as the isocyanate compound contains one or more isocyanate group within one molecule, and it is possible to use any of various aromatic, aliphatic, and alicyclic isocyanate compounds, as well as modification products of these isocyanate compounds. Specific examples of the isocyanate compound include: diisocyanate compounds such as toluene diisocyanate, diphenylmethane diisocyanate, hexamethylene diisocyanate, and isophorone diisocyanate; modification products of these diisocyanate compounds, such as isocyanate-modified products, burette-modified products, and adduct-modified products modified with polyols such as trimethylolpropane; block isocyanates stabilized by masking the isocyanate group(s) with a blocking agent; and (meth)acrylate monomers containing an isocyanate group. These isocyanate compounds may be used singly, or in combination of two or more kinds thereof. In the present disclosure, a compound containing two or more isocyanate groups within one molecule (namely, a polyfunctional isocyanate compound) is preferred. In the adhesive composition according to the present disclosure, the polyfunctional isocyanate compound is preferably dissolved in an organic solvent.

The polyfunctional isocyanate compound to be used may be a commercially available product.

Examples of commercially available products of compounds containing an isocyanurate bond include DURANATE TPA-100 (manufactured by Asahi Kasei Corporation), DURANATE MFA-75B (manufactured by Asahi Kasei Corporation), DURANATE TUL-100 (manufactured by Asahi Kasei Corporation), DURANATE TSA-100 (manufactured by Asahi Kasei Corporation), CORONATE HX (manufactured by Tosoh Corporation), DESMODUR Z4470 BA (manufactured by Sumika Bayer Urethane Co., Ltd.), DURANATE T4900-70B (manufactured by Asahi Kasei Corporation), and TAKENATE D-170N (manufactured by Mitsui Chemicals, Inc.).

Examples of commercially available products of compounds containing a burette bond include DURANATE 24A-100 (manufactured by Asahi Kasei Corporation), DURANATE 21S-75E (manufactured by Asahi Kasei Corporation), TAKENATE D-165NN (manufactured by Mitsui Chemicals, Inc.), and DESMODUR N3200 (manufactured by Sumika Bayer Urethane Co., Ltd.).

Examples of commercially available products of compounds containing a urethane bond include: DURANATE P301-75E (manufactured by Asahi Kasei Corporation) and SUMIDUR FIT (manufactured by Sumika Bayer Urethane Co., Ltd.), each of which is an adduct of hexamethylene diisocyanate and trimethylolpropane; TAKENATE D-140N (manufactured by Mitsui Chemicals, Inc.) which is an adduct of isophorone diisocyanate and trimethylolpropane; and VESTANAT EP-DC1241 (manufactured by Evonik Japan Co., Ltd.) which is an adduct of isophorone diisocyanate and hydroxyethyl acrylate.

Examples of commercially available products of compounds containing an allophanate bond include DESMODUR XP2580 (manufactured by Sumika Bayer Urethane Co., Ltd.), and DESMODUR XP2565 (manufactured by Sumika Bayer Urethane Co., Ltd.).

Other examples include: trimethylolpropane adduct-modified products, such as "CORONATE L" (trade name), manufactured by Tosoh Corporation, and "TAKENATE D-102" (trade name) and "TAKENATE D-140N" (trade name), both manufactured by Mitsui Chemicals, Inc. Further, examples of commercially available products of the block isocyanates stabilized by masking the isocyanate: groups) with a blocking agent include "CORONATE 2507" (trade name) and "CORONATE 2513" (trade name), both manufactured by Tosoh Corporation.

The mass ratio of the modified polyolefin-based resin (A) and the polyfunctional isocyanate compound in the adhesive composition according to the present disclosure is not particularly limited. However, the adhesive composition preferably contains the modified polyolefin-based resin (A) and the polyfunctional isocyanate compound, such that an equivalence ratio (NCO/OH) of the isocyanate group (NCO) of the polyfunctional isocyanate compound with respect to the hydroxy group (OH) that is a part of the carboxy group of the modified polyolefin-based resin is from 0.01 to 12.0, more preferably from 0.04 to 12.0, still more preferably from 0.1 to 12.0, and still more further preferably from 0.1 to 9.0. When the equivalence ratio is from 0.01 to 12.0, the resulting adhesive composition shows an excellent initial adhesiveness, in particular, and it is possible to form a cured product (adhesive) having sufficient crosslinking density, excellent flexibility and the like.

A derivative of the isocyanate compound may contain at least one of a urea bond or a uretdione bond.

1-4. Organic Solvent

It is preferred that the adhesive composition according to the present disclosure further contains an organic solvent, and the modified polypropylene-based resin (A) is dissolved in the organic solvent.

Specific examples of the organic solvent include: aromatic organic solvents such as toluene and xylene; aliphatic organic solvents such as n-hexane; alicyclic organic solvents such as cyclohexane, methylcyclohexane, and ethylcyclohexane; ketone-based organic solvents such as acetone and methyl ethyl ketone; alcohol-based organic solvents such as methanol and ethanol; ester-based organic solvents such as ethyl acetate and butyl acetate; and propylene glycol ether-based organic solvents such as propylene glycol methyl ether, propylene glycol ethyl ether, and propylene glycol-t-butyl ether.

As the organic solvent to be used in the adhesive composition according to the present disclosure, these may be used singly, or in combination of two or more kinds thereof.

The organic solvent is preferably an organic solvent which can be easily volatilized and removed by heating the adhesive composition. It is particularly preferred to use a mixed solvent of an alicyclic organic solvent, with an ester-based organic solvent or a ketone-based organic solvent. Further, it is preferred not to use an aromatic organic solvent, from the viewpoint of the solubility of the component (A) and environmental issues.

In the adhesive composition according to the present disclosure, the mass ratio of the organic solvent and the component (A) is not particularly limited. The mass ratio can be set depending on the type of the organic solvent and the modified polyolefin-based resin, and the like.

The content of the component (A) is preferably from 5% by mass to 25% by mass, and more preferably from 10% by mass to 20% by mass, with respect to 100% by mass of the total amount of the organic solvent and the component (A). When the content of the component (A) is within such a range, the resulting adhesive composition can be easily coated onto an adherend, and has an excellent workability.

1-5. Other Components

The adhesive composition according to the present disclosure may contain, in addition to the components described above, various components depending on the purpose.

Specific examples of other components include a curing catalyst, a styrene-based thermoplastic elastomer, a tackifier, an antioxidant, a hindered amine photostabilizer, an ultraviolet absorber, an antistatic agent, a flame retardant, a colorant, a dispersant, an adhesion-imparting agent, an antifoaming agent, a leveling agent, a plasticizer, a lubricant, and a filler.

These components will be described below.

As the other components to be descried later, the exemplified compounds may be used singly, or in combination of two or more kinds thereof.

1-5-1. Curing Catalyst

In an embodiment in which the adhesive composition according to the present disclosure further contains an isocyanate compound, the adhesive composition according to the present disclosure can contain a curing catalyst, for the purpose of promoting the cross-linking reaction of the component (A) with the isocyanate compound, facilitating curing, and obtaining an excellent adhesive performance.

It is preferred to use an organic tin compound, a tertiary amine or the like, as the curing catalyst, from the viewpoint of ease of curing and adhesive performance.

Specific examples of the organic tin compound include dioctyl tin fatty acids containing an alkyl group that has 3 to 10 carbon atoms, such as dibutyl tin dilaurate, dibutyl tin dimaleate, dioctyl tin dilaurate and dioctyl tin dimaleate.

Specific examples of the tertiary amine include tetraalkylethylenediamines such as tetramethylethylenediamine; N,N'-dialkylbenzylamines such as dimethylbenzylamine; triethylenediamine, pentamethyldiethylenetriamine, N-ethylmorphiline, N-methylmorphiline, 1-methyl-4-dimethylaminoethylpiperazine, and diazabicycloundecene.

As the curing catalyst, it is also possible to use an organic tin compound and a tertiary amine in combination.

The content ratio of the curing catalyst is preferably from 0.001 parts by mass to 5 parts by mass with respect to 100 parts by mass of the total amount of the component (A). When the content ratio of the curing catalyst is 0.001 parts by mass or more, a sufficient catalyst effect is easily obtained. When the content ratio of the curing catalyst is 5 parts by mass or less, the storage stability of the adhesive composition can be ensured.

1-5-2. Styrene-based Thermoplastic Elastomer

The adhesive composition according to the present disclosure may contain a styrene-based thermoplastic elastomer, for the purpose of improving the adhesive strength.

Specific examples of the styrene-based thermoplastic elastomer include styrene-based resins, such as styrene-butadiene copolymers, epoxy-modified styrene-butadiene copolymers, styrene-butadiene-styrene block copolymers, styrene-ethylene/propylene-styrene block copolymers (hereinafter, referred to as "SEPS"), styrene-ethylene/butylene-styrene block copolymers (hereinafter, referred to as "SEBS"), styrene-isoprene/butadiene-styrene block copolymers, and styrene-isoprene-styrene block copolymers. The styrene-based thermoplastic elastomer may contain neither acidic group nor acid anhydride group, may contain at least one of an acidic group or an acid anhydride group, or may contain an amino group.

The modification for introducing at least one of an acidic group or an acid anhydride group can be carried out using a known method. Examples of the method include graft modification in which at least one of the acidic group-containing monomer or the acid anhydride group-containing monomer described above is melt-blended with the styrene-based resin, in the presence of a radical polymerization initiator, such as an organic peroxide or an aliphatic azo compound.

The modification for introducing an amino group can be carried out using a known method. Examples of the method include: end modification in which an amino group-containing compound is added to a living end of the styrene-based resin obtained by living anionic polymerization; and graft modification in which an amine compound containing an unsaturated bond, such as 2-0-cyclohexenyl)ethylamine, is melt-blended with the styrene-based resin, in the presence of a radical polymerization initiator, such as an organic peroxide or an aliphatic azo compound.

Among the styrene-based thermoplastic elastomers, SEPS and SEBS are preferred, from the viewpoint that the adhesive strength can be improved.

1-5-3, Tackifier

The adhesive composition according to the present disclosure may contain a tackifier, for the purpose of improving the adhesive strength.

As the tackifier, it is possible to use a known tackifier, and examples thereof include polyterpene-based resins, rosin-based resins, aliphatic petroleum resins, alicyclic petroleum resins, copolymerization-based petroleum resins, and hydrogenated petroleum resins.

Specific examples of the polyterpene-based resins include α-pinene polymers, β-pinene polymers, and copolymers of these polymers with phenol, bisphenol A or the like.

Specific examples of the rosin-based resins include natural rosins, polymerized rosins and ester derivatives thereof.

Specific examples of the aliphatic petroleum resins include resins generally synthesized from C5 fraction of petroleum, which are also referred to as C5 resins. The alicyclic petroleum resins are resins generally synthesized from C9 fraction of petroleum, which are also referred to as C9 resins.

Specific examples of the copolymerization-based petroleum resins include C5/C9 copolymer resins.

The hydrogenated petroleum resins are resins generally produced by the hydrogenation of various types of petroleum resins described above.

The content of the tackifier is preferably from 1% by mass to 20% by mass, and more preferably from 1% by mass to 10% by mass, with respect to 100% by mass of the adhesive composition, from the viewpoint of obtaining an excellent resistance to hot water.

The adhesive composition according to the present disclosure preferably has a viscosity at 25° C. of from 10 mPa·s to 5,000 mPa·s. The adhesive composition preferably has a viscosity at 25° C. of 10 mPa·s or more, from the viewpoint of obtaining excellent coating ability. Further, the adhesive composition preferably has a viscosity at 25° C. of 5,000 mPa·s or less, and more preferably 1,000 mPa·s or less, from the viewpoint of obtaining excellent leveling properties.

The adhesive composition according to the present disclosure can be favorably used for the adhesion of a polyolefin resin molded product to another member (such as a metallic member or a resinous member). The adhesive composition can be used not only for the adhesion between polyolefin resin molded products such as polyolefin resin films, but also for the adhesion of a polyolefin resin film to a metal foil made of aluminum or the like, and for the adhesion of a polyolefin resin film to a metal layer of a composite film that has a resin layer and the metal layer, and the like. The adhesive layer has a high peel strength at normal temperature and a high peel strength at a high temperature, exhibiting excellent adhesiveness, and also has a high electrolyte resistance, and thus can be preferably used as a packaging material for a lithium ion battery.

2. Method of Producing Adhesive Composition

The second aspect of the present invention (a method of producing the adhesive composition according to the present disclosure) is a method of producing an adhesive composition the method including:

a step (hereinafter, referred to as step "S1") of graft-modifying a polypropylene-based resin with an α, β-unsaturated carboxylic acid compound or a derivative thereof, to produce a polypropylene-based resin (b) containing at least one of an acidic group or an acid anhydride group; and a step (hereinafter, referred to as "step S2") of carrying out a modification reaction of at least one of the acidic group or the acid anhydride group of the polypropylene-based resin (b) containing at least one of the acidic group or the acid anhydride group, thereby introducing a (meth)acryloyl group (a) represented by the following Formula (I) into the polypropylene-based resin (b) containing at least one of the acidic group or the acid anhydride group to produce a modified polypropylene-based resin (A) that contains at least one of an acidic group or an acid anhydride group, and that contains the (meth)acryloyl group (a):

$$CH_2=CR^1CO— \quad (I)$$

in which, in Formula (I), $R^1$ represents a hydrogen atom or a methyl group.

The respective substances which can be used in step S1, the usage ratios thereof, and the like, as well as the method of producing the polypropylene-based resin (h) containing at least one of the acidic group or the acid anhydride group in step S1, are the same as described for the adhesive composition according to the first aspect of the present invention, and the specific details thereof are omitted in this section.

The respective substances which can be used in step S2, the usage ratios thereof, and the like, as well as the method of producing the modified polypropylene-based resin (A) in step S2, are the same as described for the adhesive composition according to the first aspect of the present invention, and the specific details thereof are omitted in this section.

In the second aspect of the present invention, a solution containing the modified polypropylene-based resin (A) obtained by the modification in step S2 may be used as it is, as the adhesive composition. Alternatively, a resultant that is obtained by precipitating the modified polypropylene-based resin (A) in a poor solvent for polypropylene-based resins, such as acetone, removing the unreacted (meth)acryloyl derivative and the reaction catalyst, and then drying to remove the solvent, may be used as the adhesive composition. In the case of carrying out the precipitation and drying, it is preferred that the method further includes a step (hereinafter, referred to as "step S3") of dissolving the modified polyolefin resin (A) in an organic solvent.

The type of the organic solvent which can be used in step S3, the mixing ratio of the organic solvent and the modified polypropylene-based resin (A), and the like, are the same as described for the adhesive composition according to the first aspect of the present invention, and the specific details thereof are omitted in this section.

Step S3 is preferably carried out at a temperature of 80° C. or lower, and more preferably at a temperature from 30° C. to 60° C.

In the second aspect of the present invention, it is preferred that the method further includes a step (hereinafter, referred to as "step S4") of mixing, with other components, the solution containing the modified polypropylene-based resin (A) (a solution obtained by dissolving the modified polypropylene-based resin (A) in an organic solvent, in an embodiment in which the solution containing the modified polypropylene-based resin (A) obtained by the modification in step S2 is subjected to precipitation and drying).

Step S4 is a step of mixing the solution containing the modified polypropylene-based resin (A) with other components. Here, the "other components" refer to components which may be contained in the adhesive composition according to the first aspect of the present invention, such as a radical polymerization initiator, an isocyanate compound and the like. In an embodiment in which the other components include an isocyanate compound, it is preferred, in step S4, that the solution containing the component (A) is mixed first with the other components except for the isocyanate compound, and then the resulting mixture is mixed with the isocyanate compound.

In step S4, the mixing is preferably carried out at a temperature of 40° C. or lower, and more preferably at a temperature of from 10° C. to 30° C.

3. Heat Fusible Member

A third aspect of the present invention (a heat fusible member according to the present disclosure) is a heat fusible member including: an adhesive layer that is a cured product of the adhesive composition according to the first aspect of the present invention a metal layer bonded to one surface of the adhesive layer; and a heat fusible resin layer bonded to another surface of the adhesive layer.

Figure 2:
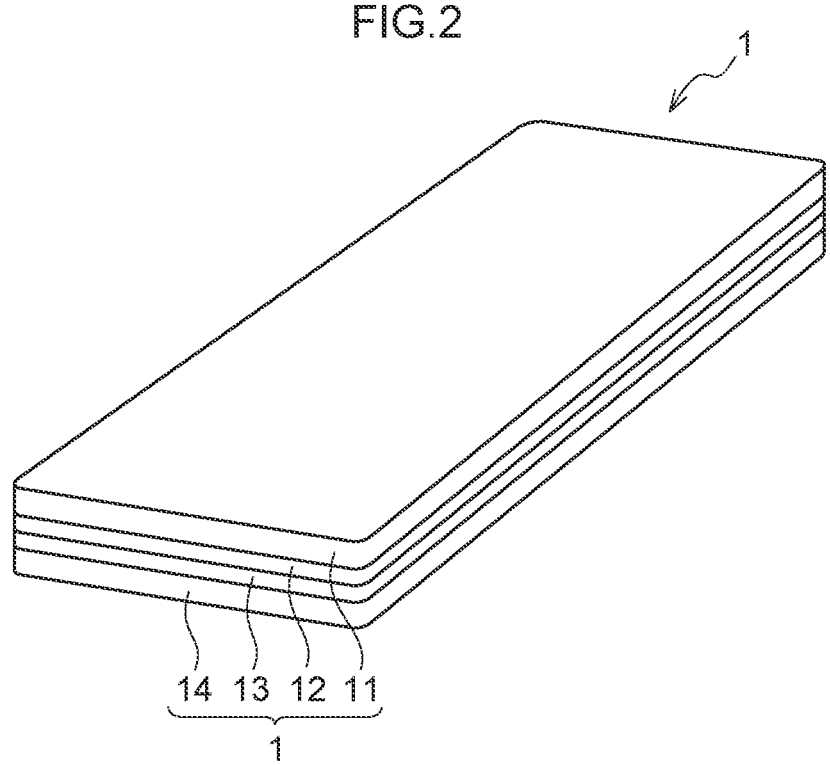
FIG. 2 is a schematic perspective view showing another example of the heat fusible member according to the present disclosure.

Each of FIG. 1 and FIG. 2 shows a schematic diagram of one example of the heat fusible member according to the present disclosure. In other words, a heat fusible member 1 shown in FIG. 1 includes a heat fusible resin layer 11, an adhesive layer 12, and a metal layer 13, in the order mentioned. Further, a heat fusible member 1 shown in FIG. 2 includes a heat fusible resin layer 11, an adhesive layer 12, a metal layer 13, and other layer 14, in the order mentioned.

A shape of the heat fusible member according to the present disclosure may be set as appropriate, depending on the purpose. The heat fusible member may be in the form of, for example, a film, a sheet, a plate, an angled shape, or a rod, but not particularly limited thereto.

The heat fusible resin layer described above is a layer containing a resin that melts with heat, and this resin is capable of fusion bonding a material that constitutes a layer of one surface side with a material that constitutes a layer of the other surface side. The heat fusible resin layer is preferably a layer containing a resin that melts at a temperature of from 50° C. to 200° C. A resin having such a property may be, for example, a polyolefin resin, a polyamide resin, or a polyester resin. Among these, a polyolefin resin is preferred, because it allows for heat fusion bonding with a sufficient bonding strength. Further, the polyolefin resin is preferably polypropylene. In particular, a non-stretched polypropylene is more preferred, because the dimensional changes (shrinkage) is small when members are integrated using the heat fusible member.

If necessary, the heat fusible resin layer may further contain additives, such as a lubricant, a filler, a thermal stabilizer, an antioxidant, an ultraviolet absorber, an antistatic agent, a flame retardant, a colorant, a dispersant, or an adhesion-imparting agent.

The thickness of the heat fusible resin layer varies depending on the material of the resin and the like, and is not particularly limited. However, When the heat fusible resin layer is a layer containing a non-stretched polypropylene, for example, the layer preferably has a thickness of from 10 urn to 200 μm, and more preferably from 20 μm to 100 μm. When the layer containing a non-stretched polypropylene has a thickness of from 10 μm to 200 μm, it is possible to obtain a heat fused composite product, such as a sealing container, which is less susceptible to breakage and has a high durability.

The adhesive layer described above is a layer formed by curing the adhesive composition according to the present disclosure. The thickness of the adhesive layer is not particularly limited, but preferably from 1 μm to 20 μm, and more preferably from 2 μm to 10 μm. When the adhesive layer has a thickness of from 1 μm to 20 μm, a processing, such as bending, can be carried out easily when the heat fusible member is, for example, in the shape of a sheet The metal layer described above is a layer containing a metal or an alloy. Examples of the metal or the alloy include: aluminum, iron, titanium, magnesium, copper, nickel, chromium, and other metals; and alloys thereof. Among these, aluminum has an excellent processability, and thus is preferred. The thickness of the metal layer varies depending on the material thereof and the like, and is not particularly limited. When the metal layer is composed of aluminum, for example, the metal layer preferably has a thickness of from 20 μm to 100 μm, more preferably from 20 μm to 80 μm, and still more preferably from 30 μm to 60 μm.

When the heat fusible member according to the present disclosure includes the metal layer, the heat fusible member may include another layer 14 on a surface of the metal layer 13, as shown in FIG. 2. A material constituting the other layer preferably contains a resin, from the viewpoint of protecting the metal layer. In other words, the other layer is preferably a resin layer. The resin is not particularly limited, and a resin such as a polyamide resin or a polyester resin can be used. The transparency of the resin layer is not particularly limited. However, when the resin layer is transparent or semi-transparent, it is possible to obtain an excellent appearance when a heat fused composite product such as a sealing container is completed. The thickness of the other layer is not particularly limited, and is preferably from 30 μm to 60 μm, and more preferably from 30 μm to 50 μm.

The heat fusible member using the adhesive composition according to the present disclosure is capable of preventing the degeneration of components while retaining the structure of the member, because the heat fusible member has a high peel strength at normal temperature and a high peel strength at a high temperature, exhibiting excellent adhesiveness, and also has an excellent resistance to a solvent, such as an electrolyte.

When the heat fusible member is used as a packaging material for a lithium ion battery, the adhesiveness and the like can be maintained upon changes in the temperature of a battery storage or usage environment, particularly, upon an increase in the temperature of battery constituent materials due to chemical reasons associated with charging or discharging, or in a temperature range higher than normal temperature such as those in summer period or inside an automobile.

4. Method of Producing Heat Fusible Member

A fourth aspect according to the present invention (a method of producing the heat fusible member according to the present disclosure) is a method of producing the heat fusible member according to the third aspect of the present invention.

The heat fusible member shown in FIG. 1 is produced, for example, by the method (1) or (2) shown below.

(1) A method in which the adhesive composition is applied onto a surface of a metal foil, a metal film or the like for forming the metal layer 13; then the organic solvent contained in the adhesive composition is removed to form the adhesive layer 12; subsequently, the surface on which the adhesive layer 12 has been formed is brought into contact with a resin film (hereinafter, referred to as "heat fusible resin film") for forming the heat fusible resin layer 11, and the resultant is subjected to compression bonding while heating, followed by carrying out irradiation of an active energy ray from the heat fusible resin film side.

(2) A method in which the adhesive composition is applied onto a surface of a heat fusible resin film; then the organic solvent contained in the adhesive composition is removed to form the adhesive layer 12; subsequently, the surface on which the adhesive layer 12 has been formed is brought into contact with a metal foil or the like for forming the metal layer 13, and the resultant is subjected to compression bonding while heating, followed by carrying out irradiation of an active energy ray from the heat fusible resin film side.

Further, the heat fusible member shown in FIG. 2 is produced by any one of the methods shown below.

(3) A method in which the adhesive composition is applied onto a surface of a metal layer 13 of a composite film that includes a resin layer constituting the other layer 14, and the metal layer 13 formed on one surface of the resin layer by vapor-deposition or the like; then the organic solvent contained in the adhesive composition is removed to form the adhesive layer 12; subsequently, the surface on which the adhesive layer 12 has been formed is brought into contact with a heat fusible resin film, and the resultant is subjected to compression bonding while heating, followed by carrying out irradiation of an active energy ray from the heat fusible resin film side.

(4) A method in which the adhesive composition is applied onto a surface of a heat fusible resin film; then the organic solvent contained in the adhesive composition is removed to form the adhesive layer 12; subsequently, the surface on which the adhesive layer 12 has been formed is brought into contact with a surface of a metal layer 13 of a composite film that includes a resin layer constituting the other layer 14, and the metal layer 13 formed on one surface of the resin layer by vapor-deposition or the like, and the resultant is compression bonding while heating, followed by carrying out irradiation of an active energy ray from the heat fusible resin film side.

(5) A method in which a film for forming the other layer 14 is formed by extrusion molding on a surface of the metal layer 13 of the laminated body obtained by the method (1) or (2), followed by carrying out irradiation of an active energy ray from the heat fusible resin film side.

The active energy ray to be used for curing the adhesive composition according to the present disclosure may be, for example, an ultraviolet ray, a visible ray, or an electron beam. Among these, an ultraviolet ray is preferred.

An apparatus for ultraviolet ray irradiation may be, for example, a high-pressure mercury lamp, a metal halide lamp, a UV (ultraviolet) electrodeless lamp, or an LED (light emitting diode).

The irradiation energy should be set as appropriate, depending on the type of the active energy ray and the composition of the components. However, in the case of using a high-pressure mercury lamp, as one example, the irradiation energy in a UV-A region (a wavelength range of from 315 nm to 400 nm) is preferably from 100 mJ/cm$^2$ to 5,000 mJ/cm$^2$, and more preferably from 200 mJ/cm$^2$ to 2,000 mJ/cm$^2$.

In many cases, the adhesive composition is applied onto a surface of a material for forming a metal layer, such as a metal foil, or onto a surface of a metal layer of a composite film that includes the metal layer and other layer (resin layer), but not particularly limited thereto. In the case of using a metal foil, it is preferred to use an aluminum foil having a thickness of from 20 μm to 100 μm. Thereby, a heat fusible member which is less susceptible to breakage can be easily formed. In the case of using a composite film, it is preferred that a metal layer contains aluminum, and other layer (resin layer) contains a polyamide resin, a polyester resin, or the like. Further, in the case of producing the heat fusible member shown in FIG. 2 without using a composite film, accordingly, in the case of using the method (5) described above, it is preferred to use, as the film for forming other layer 14, a film that includes a polyamide resin, a polyester resin, or the like.

As the heat fusible resin film, it is possible to use a polyolefin resin film, a polyamide resin film, a polyester resin film or the like. Such a resin film can be produced by a film forming method, such as an extrusion method, a cast molding method, a T-die method, or an inflation method. The heat fusible resin film preferably has a thickness of from 10 μm to 200 μm. In the present disclosure, a polyolefin resin film is preferred, from the viewpoint that the heat fusion bonding can be carried out easily to complete the heat fusible member or to produce a heat fused composite product. A non-stretched polypropylene film is more preferred, from the viewpoint that it is possible to obtain a heat fused composite product, such as a sealing container, which is less susceptible to breakage and has an excellent durability. In the case of using a non-stretched polypropylene film, the film preferably has a thickness of from 10 μm to 200 μm, and more preferably from 20 μm to 100 μm.

The adhesive composition can be applied by a conventionally known method, for example, by a method using a bar coater or a gravure coater. The thickness of the resulting coating film, and a temperature for drying the coating film are not particularly limited, respectively. The temperature for drying the coating film is not particularly limited, and is preferably from 30° C. to 100° C., from the viewpoint of improving the workability.

The coating film, which has been dried as described above, generally has tackiness and adhesiveness, and can bond two members without application of heat. However, in the case of producing the heat fusible member according to the present disclosure, it is possible to use a method, for example, in which compression bonding and the like are carried out while heating to a temperature that is selected taking into account the melting point, melt viscosity and the like, of the resin component based on the modified polyolefin-based resin. The heating and compression bonding are carried out, for example, under conditions of a temperature of 180° C., a pressure of 0.3 MPa, and a compression bonding time of 2 seconds.

Further, conditions (hereinafter, referred to as "aging conditions") for promoting the cross-linking reaction of the component (A) with an isocyanate compound to complete the production of the heat fusible member are not particularly limited, and are preferably set depending on the material of a metal foil, the material of a heat fusible resin film, a melting temperature and the like, as well as the composition of an adhesive layer and the like. Under the aging conditions, heating may be carried out at a temperature of 40° C. for about 3 to 7 days, or alternatively, curing by an active energy ray, such as an ultraviolet ray or an electron beam, may be carried out in combination with heating for the purpose of reducing the aging time, using a polyolefin that contains at least one of an acidic group or an acid anhydride group and that contains an ethylenically unsaturated group as the component (A).

5. Applications

The heat fusible member according to the present disclosure can be used in various industrial products in the fields of electrical devices, automobiles, industries and others.

Examples of applications in the field of electrical devices include packaging materials for secondary batteries, such as lithium ion batteries and lithium ion polymer batteries, and decoration by affixing of decorative sheets, adhesion of metal members with resins, and sealing of electronic components in mobile devices, television casings, white goods casings, or the like.

Examples of applications in the field of automobiles include adhesion of exterior materials composed of metal members and resins, as well as adhesion of real leather, fabrics, instrument panels, foam sheets, and decorative sheets with substrates, in interior and exterior members such as pillars, moldings, door trims, spoilers, roofs and the like.

Examples of applications in the field of industries include adhesion between multilayer films, such as industrial packaging materials and barrier films.

Examples of applications in other fields include adhesion of logistics materials, building materials, daily goods, and sports goods.

Among these, the heat fusible member according to the present disclosure is preferably used as a packaging material for a lithium ion battery, because the heat fusible member has a high peel strength at normal temperature and a high peel strength at a high temperature, exhibiting excellent adhesiveness, and also has a high electrolyte resistance.

EXAMPLES

The present invention will be more specifically described below, with reference to Examples and Comparative Examples. It is noted, however, that the present invention is in no way limited to these Examples shown below.

1. Production Examples
1) Production Example 1 [Production of A1]

Into a twin-screw extruder (L/D=42; diameter=58 mm), 100 parts by mass of a propylene-ethylene-1-butene copolymer (propylene component: 72% by mole, ethylene component: 7% by mole, 1-butene component: 21% by mole, weight average molecular weight: 120,000, Tm 100° C.), as an unmodified polypropylene-based resin, 2.3 parts bye mass of maleic anhydride, 4 parts by mass of laurel methacrylate, and 1.5 parts by mass of 2,5-dimethyl-2,5-di(t-butylperoxy)hexane were added. The reaction was carried out under the conditions of a residence time of 10 minutes and a barrel temperature of 180° C. (a first barrel to a seventh barrel). Degassing was carried out in the seventh barrel, and the remaining unreacted maleic anhydride and lauryl methacrylate were removed, to obtain a reaction product (a polypropylene-based resin to which maleic anhydride and laurel methacrylate were added).

Thereafter, into a four-neck flask to which a stirrer, a cooling tube, and a dropping funnel were attached, 100 parts by mass of the resulting reaction product, 300 parts by mass of toluene, and 0.36 parts by mass of p-toluenesulfonic acid were added, heated to 60° C., and stirred to dissolve the components. Subsequently, 0.015 parts by mass of hydroquinone monomethyl ether as a polymerization inhibitor was added to the flask, and dissolved. While maintaining the resulting solution at 60° C., a solution obtained by dissolving 2.2 parts by mass of 2-hydroxyethyl acrylate in 100 parts by mass of toluene was added thereto over 2 hours. After the completion of the addition, the resultant was further allowed to react at the same temperature for 8 hours. After the completion of the reaction, free 2-hydroxyethyl acrylate was quantified by gas chromatography, which was found to be in an amount of 0%. Based on this result, the bonding rate of the (meth)acryloyl groups was calculated in accordance with an equation to be described later, which was found to be 50%. This means that 50% of the carboxyl groups based on maleic anhydride units in the polypropylene-based resin to which maleic anhydride and lauryl methacrylate were added were esterified.

The obtained solution of an esterification product of the polypropylene-based resin to which maleic anhydride and lauryl methacrylate were added was diluted with toluene, to prepare a solution having a resin solid content of 15% (hereinafter, referred to as "A1").

Production Example 2 [Production of A2]

In a four-neck flask to which a stirrer, a cooling tube, and a dropping funnel were attached, 100 parts by mass of a propylene-1-butene copolymer (propylene component: 73% by mole, 1-butene component: 27% by mole, weight average molecular weight: 200,000, Tm=85° C.), as an unmodified polypropylene-based resin, was dissolved by heating in 400 parts by mass of toluene. Thereafter, 1.5 parts by mass of aconitic anhydride, 3 parts by mass of octyl acrylate, and 0.5 parts by mass of benzoyl peroxide were each added dropwise over 3 hours, and the resultant was allowed to react for another one hour. After the completion of the reaction, the resultant was cooled to room temperature, and the resulting crude reaction product was introduced into a large excess of acetone to remove the unreacted aconitic anhydride and octyl acrylate. Then, the resin precipitated in acetone was separated and dried, to obtain a reaction product (a polypropylene-based resin to which aconitic anhydride and octyl acrylate were added).

Thereafter, into a four-neck flask to which a stirrer, a cooling tube, and a dropping funnel were attached, 100 parts by mass of the resulting reaction product, and 300 parts by mass of toluene were added, heated to 60° C., and stirred to dissolve the components. Subsequently, a solution obtained by dissolving 0.75 parts by mass of monoethanolamine in 100 parts by mass of toluene was added to the flask over 2 hours. After the completion of the addition, the resultant was further allowed to react at the same temperature for 8 hours. To the resulting solution. 0.13 parts by mass of triethylamine, and 0.015 parts by mass of hydroquinone monomethyl ether as a polymerization inhibitor were added, and dissolved. While maintaining the resulting solution at 60° C., a solution obtained by dissolving 1.8 parts by mass of 2-isocyanate ethyl acrylate in 100 parts by mass of toluene was added thereto over 2 hours. After the completion of the addition, the resultant was further allowed to react at the same temperature for 8 hours. After the completion of the reaction, free 2-isocyanate ethyl acrylate was quantified by gas chromatography, which was found to be in an amount of 0%. Based on this result, the bonding rate of the (meth)acryloyl groups was calculated in accordance with the equation to be described later, which was found to be 33%. This means that 33% of the carboxyl groups based on aconitic anhydride units in the polypropylene-based resin to which aconitic anhydride and octyl acrylate were added were amidated and urethanized.

The obtained solution of an amidated and urethanized product of the polypropylene-based resin to which aconitic anhydride and octyl acrylate were added was diluted with toluene, to prepare a solution having a resin solid content of 15% (hereinafter, referred to as "A2").

Production Example 3 [Production of A3]

Into a twin-screw extruder which is the same as in Production Example 1, 100 parts by mass of a propylene-1-butene copolymer (propylene component: 67% by mole, 1-butene component: 33% by mole, weight average molecular weight: 200,000, Tm 75° C.), as an unmodified polypropylene-based resin, 8 parts by mass of itaconic anhydride, 5 parts by mass of tridecyl acrylate, and 2 parts by mass of lauroyl peroxide were added. The reaction was carried out under the conditions of a residence time of 10 minutes and a barrel temperature of 170° C. (the first barrel to the seventh barrel). Degassing was carried out in the seventh barrel, and the remaining unreacted itaconic anhydride and tridecyl acrylate were removed, to obtain a reaction product (a polypropylene-based resin to which itaconic anhydride and tridecyl acrylate were added).

Thereafter, into a four-neck flask to which a stirrer, a cooling tube, and a dropping funnel were attached, 100 parts by mass of the resulting reaction product, 300 parts by mass of toluene, and 0.76 parts by mass of triethylamine were added, heated to 60° C., and stirred to dissolve the components. Subsequently, 0.015 parts by mass of hydroquinone monomethyl ether as a polymerization inhibitor was added to the flask, and dissolved. While maintaining the resulting solution at 60° C., a solution obtained by dissolving 10.8 parts by mass of glycidyl methacrylate in 100 parts by mass of toluene was added thereto over 2 hours. After the completion of the addition, the resultant was further allowed to react at the same temperature for 8 hours. After the completion of the reaction, free glycidyl methacrylate was quantified by gas chromatography, which was found to be in an amount of 0%. Based on this result, the bonding rate of the (meth) acryloyl groups was calculated in accordance with the equation to be described later, which was found to be 50%. This means that 50% of the carboxyl groups based on itaconic anhydride units in the polypropylene-based resin to which itaconic anhydride and tridecyl acrylate were added were esterified.

The obtained solution of an esterification product of the polypropylene-based resin to which itaconic anhydride and tridecyl acrylate were added was diluted with toluene, to prepare a solution having a resin solid content of 15% (hereinafter, referred to as "A3").

4) Production Example 4 [Production of A4]

Into a twin-screw extruder which is the same as in Production Example 1, 100 parts by mass of a propylene-1-butene copolymer (propylene component: 84% by mole. 1-butene component: 16% by mole, weight average molecular weight: 210,000, Tm=98° C.), as an unmodified polypropylene-based resin, 2.5 parts by mass of maleic anhydride, and 0.8 parts by mass of 2,5-dimethyl-2,5-di(t-butylperoxy)hexane were added. The reaction was carried out under the conditions of a residence time of 10 minutes and a barrel temperature of 180° C. (the first barrel to the seventh barrel). Degassing was carried out in the seventh barrel, and the remaining unreacted maleic anhydride was removed, to obtain a reaction product (a polypropylene-based resin to which maleic anhydride was added).

Thereafter, into a four-neck flask to which a stirrer, a cooling tube, and a dropping funnel were attached, 100 parts by mass of the resulting reaction product, and 300 parts by mass of toluene were added, heated to 60° C., and stirred to dissolve the components, To the resulting solution, 0.5 parts by mass of water was added, and the resultant was allowed to react at the same temperature for 8 hours. Subsequently, 0.22 parts by mass of triethylamine, and 0.015 parts by mass of hydroquinone monomethyl ether as a polymerization inhibitor were added, and dissolved. While maintaining the resulting solution at 60° C., a solution obtained by dissolving 3.1 parts by mass of 2-isocyanate ethyl acrylate in 100 parts by mass of toluene was added thereto over 2 hours. After the completion of the addition, the resultant was further allowed to react at the same temperature for 8 hours. After the completion of the reaction, free 2-isocyanate ethyl acrylate was quantified by gas chromatography, which was found to be in an amount of 0%. Based on this result, the bonding rate of the (meth)acryloyl groups was calculated in accordance with the equation to be described later, which was found to be 50%. This means that 50% of the carboxyl groups based on maleic anhydride units in the polypropylene-based resin to which maleic anhydride was added were amidated.

The obtained solution of an amidation product of the polypropylene-based resin to which maleic anhydride was added was diluted with toluene, to prepare a solution having a resin solid content of 15% (hereinafter, referred to as "A4").

5) Production Example 5 [Production of A5]

Into a twin-screw extruder (L/D=42; diameter=58 mm), 100 parts by mass of a propylene-1-butene copolymer (propylene component: 84% by mole. 1-butene component: 16% by mole, weight average molecular weight: 210,000, Tm=98° C.), as an unmodified polypropylene-based resin, 1.3 parts by mass of maleic anhydride, and 0.5 parts by mass of 2,5-dimethyl-2,5-di(t-butylperoxy)hexane were added. The reaction was carried out under the conditions of a residence time of 10 minutes and a barrel temperature of 180° C. (the first barrel to the seventh barrel). Degassing was carried out in the seventh barrel, and the remaining unreacted maleic anhydride was removed, to obtain a reaction product (a polypropylene-based resin to which maleic anhydride was added).

Thereafter, into a four-neck flask to which a stirrer, a cooling tube, and a dropping funnel were attached, 100 parts by mass of the resulting reaction product, and 300 parts by mass of toluene were added, heated to 60° C., and stirred to dissolve the components. Subsequently, a solution obtained by dissolving 1.14 parts by mass of diethanolamine in 100 parts by mass of toluene was added to the flask over 2 hours. After the completion of the addition, the resultant was further allowed to react at the same temperature for 8 hours. To the resulting solution, 0.13 parts by mass of triethylamine, and 0.015 parts by mass of hydroquinone monomethyl ether as a polymerization inhibitor were added, and dissolved. While maintaining the resulting solution at 60° C., a solution obtained by dissolving 1.8 parts by mass of 2-isocyanate ethyl acrylate in 100 parts by mass of toluene was added thereto over 2 hours. After the completion of the addition, the resultant was further allowed to react at the same temperature for 8 hours. After the completion of the reaction, free 2-isocyanate ethyl acrylate was quantified by gas chromatography, which was found to be in an amount of 0%. Based on this result, the bonding rate of the (meth) acryloyl groups was calculated in accordance with the equation to be described later, which was found to be 50%. This means that 50% of the carboxyl groups based on maleic anhydride units in the polypropylene-based resin to which maleic anhydride was added were amidated and urethanized.

The obtained solution of an amidated and urethanized product of the polypropylene-based resin to which maleic anhydride was added was diluted with toluene, to prepare a solution having a resin solid content of 15% (hereinafter, referred to as "A5").

Production Example 6 [Production of A6]

Into a twin-screw extruder (L/D=42; diameter=58 mm), 100 parts by mass of a propylene-ethylene-1-butene copolymer (propylene component: 72% by mole, ethylene component: 7% by mole, 1-butene component: 21% by mole, weight average molecular weight: 120,000, Tm=100° C.), as an unmodified polypropylene-based resin, 2.3 parts by mass of maleic anhydride, 4 parts by mass of lauryl methacrylate, and 1.5 parts by mass of 2,5-dimethyl-2,5-di(t-butylperoxy) hexane were added. The reaction was carried out under the conditions of a residence time of 10 minutes and a barrel temperature of 180° C. (the first barrel to the seventh barrel). Degassing was carried out in the seventh barrel, and the remaining unreacted maleic anhydride and lauryl methacrylate were removed, to obtain a reaction product (a polypropylene-based resin to which maleic anhydride and lauryl methacrylate were added).

Into a 300 mL flask equipped with a condenser and a stirrer, the resulting reaction product and toluene were added, and the resultant was stirred at 60° C. for 10 minutes. After the completion of the dissolution, the resultant was cooled to room temperature, to prepare a resin solution having a resin solid content of 15% (hereinafter, referred to as "A6").

7) Production Example 7 [Production of A7]

In a four-neck flask to which a stirrer, a cooling tube, and a dropping funnel were attached, 100 parts by mass of a propylene-1-butene copolymer (propylene component: 73% by mole. 1-butene component: 27% by mole, weight average molecular weight: 200,000, Tm=85° C.), as a polypropylene-based resin, was dissolved by heating in 400 parts by mass of toluene. Thereafter, 1.5 parts by mass of aconitic anhydride, 3 parts by mass of octyl acrylate, and 0.5 part by mass of benzoyl peroxide were each added dropwise over 3 hours, and the resultant was allowed to react for another one hour. After the completion of the reaction, the resultant was cooled to room temperature, and the resulting crude reaction product was introduced into a large excess of acetone to remove the unreacted aconitic anhydride and octyl acrylate, to obtain a reaction product (a polypropylene-based resin to which aconitic anhydride and octyl acrylate were added).

Into a 300 mL flask equipped with a condenser and a stirrer, the resulting reaction product and toluene were added, and the resultant was stirred at 60° C. for 10 minutes. After the completion of the dissolution, the resultant was cooled to room temperature, to prepare a resin solution having a resin solid content of 15% (hereinafter, referred to as "A7").

8) Production Example 8 [Production of A8]

Into a twin-screw extruder which is the same as in Production Example 1, 100 parts by mass of a propylene-1-butene copolymer (propylene component: 67% by mole, 1-butene component: 33% by mole, weight average molecular weight: 200,000, Tm 75° C.), as a polypropylene-based resin, 8 parts by mass of itaconic anhydride, 5 parts by mass of tridecyl acrylate, and 2 parts by mass lauroyl peroxide were added. The reaction was carried out under the conditions of a residence time of 10 minutes and a barrel temperature of 170° C. (the first barrel to the seventh barrel). Degassing was carried out in the seventh barrel, and the remaining unreacted itaconic anhydride and tridecyl acrylate were removed, to obtain a reaction product (a polypropylene-based resin to which itaconic anhydride and tridecyl acrylate were added).

Into a 300 mL flask equipped with a condenser and a stirrer, the resulting reaction product and toluene were added, and the resultant was stirred at 60° C. for 10 minutes. After the completion of the dissolution, the resultant was cooled to room temperature, to prepare a resin solution having a resin solid content of 15% (hereinafter, referred to as "48").

9) Production Example 9 [Production of A9]

Into a twin-screw extruder (L/D=42; diameter=58 mm), 100 parts by mass of a propylene-1-butene copolymer (propylene component: 84% by mole, 1-butene component: 16% by mole, weight average molecular weight: 210,000, Tm=98° C.), as a polypropylene-based resin, 2.5 parts by mass of maleic anhydride, and 0.8 part by mass of 2,5-dimethyl-2,5-di(t-butylperoxy)hexane were added. The reaction was carried out under the conditions of a residence time of 10 minutes and a barrel temperature of 180° C. (the first barrel to the seventh barrel). Degassing was carried out in the seventh barrel, and the remaining unreacted maleic anhydride was removed, to obtain a reaction product (a polypropylene-based resin to which maleic anhydride was added).

Into a 300 mL flask equipped with a condenser and a stirrer, the resulting reaction product and toluene were added, and the resultant was stirred at 60° C. for 10 minutes. After the completion of the dissolution, the resultant was cooled to room temperature, to prepare a resin solution having a resin solid content of 15% (hereinafter, referred to as "A9").

Production Example 10 [Production of A10]

Into a twin-screw extruder (L/D=42; diameter=58 mm), 100 parts by mass of a propylene-1-butene copolymer (propylene component: 84% by mole, 1-butene component: 16% by mole, weight average molecular weight: 210,000, Tm=98° C.), as a polypropylene-based resin, 1.3 parts by mass of maleic anhydride, and 0.5 parts by mass of 2,5-dimethyl-2,5-di(t-butylperoxy)hexane were added. The reaction was carried out under the conditions of a residence time of 10 minutes and a barrel temperature of 180° C. (the first barrel to the seventh barrel). Degassing was carried out in the seventh barrel, and the remaining unreacted maleic anhydride was removed, to obtain a reaction product (a polypropylene-based resin to which maleic anhydride was added).

Into a 300 mL flask equipped with a condenser and a stirrer, the resulting reaction product and toluene were added, and the resultant was stirred at 60° C. for 10 minutes. After the completion of the dissolution, the resultant was cooled to room temperature, to prepare a resin solution having a resin solid content of 15% (hereinafter, referred to as "A10").

Methods of Evaluating Reaction Products

For each of the reaction products A1 to A5 obtained in the Production Examples 1 to 5, the weight average molecular weight, the melting point, the energy of fusion, the graft amount of the at least one of the acidic group-containing monomer or the acid anhydride group-containing monomer, the graft amount of the (meth)acrylic acid long-chain alkyl ester, the content and the average number of functional groups of the (meth)acryloyl group, as well as the bonding rate of the (meth)acryloyl group were measured or calculated, in accordance with the methods to be described later.

These results are shown in Table 1. It is noted that the description "% by weight" in Table 1 has the same meaning as "% by mass".

(1) Weight Average Molecular Weight

Apparatus: HLC-8220 GPC (manufactured by Tosoh Corporation)

Columns: TSKgel GMHXL, 2 pieces (manufactured by Tosoh Corporation)

Column temperature: 40° C.

Eluent: tetrahydrofuran, 1.00 mL/min

Detector: RI (differential refractometer)

The molecular weight measured by GPC was converted based on the molecular weight of polystyrene.

(2) Melting Point

The melting point was measured in accordance with JIS K 7121 (established in 1987), using a differential scanning calorimeter at a temperature rise rate of 10° C./min, and the temperature at which the reaction product was crystalized was defined as the melting point (hereinafter, referred to as "Tm").

(3) Energy of Fusion

The energy of fusion was measured in accordance with JIS K 7122 (established in 1987), using a differential scanning calorimeter at a temperature rise rate of 10° C./min.

(4) Graft Amount of Acid Anhydride Group-Containing Monomer

The graft amount of the acid anhydride group-containing monomer is defined by the following equations, from an acid value determined by the measurement to be described later.

Graft amount (% by mass)=acid value×(M+1,008)×100/(1,000×56.1×V)

M=molecular weight of acid anhydride group-containing monomer

=valence of acidic group upon hydrolysis of acid anhydride group-containing monomer The graft amount of the acid anhydride group-containing monomer in each of the reaction products A1 to A5 was calculated in accordance with each of the following equations:

Graft amount in A1 (% by mass)=acid value×99.1×100/(1,000×56.1×2)

Graft amount in A2 (% by mass)=acid value×157.1×100/(1,000×56.1×3)

Graft amount in A3 (% by mass)=acid value×113.1×100/(1,000×56.1×2)

Graft amount in A4 (% by mass)=acid value×99.1×100/(1,000×56.1×2)

Graft amount in A5 (% by mass)=acid value×99.1×100/(1,000×56.1×2).

◆ Method of Measuring Acid Value

The acid value indicates the amount of potassium hydroxide in terms of milligram, which is required to neutralize the acid contained in 1 g of a sample, and was measured in accordance with JIS K 0070:1992.

Specifically, 0.2 g of a sample to be measured was precisely weighed into an Erlenmeyer flask with a stopper, and 20 mL of tetrahydrofuran was added thereto. The sample was dissolved while heating, to obtain a sample solution. To the resulting sample solution, several drops of a 1 w/v % phenolphthalein ethanol solution, as an indicator, were added, and titration was carried out using, as a titrant, a 0.1 mol/L ethanol solution of potassium hydroxide, until the sample solution showed a pink color that sustained for 10 seconds. Thereafter, the acid value was calculated in accordance with the following equation:

Acid value (mg KOH/g)=(T×F×56.11×0.1)/W

In the above equation, T represents a titer (mL), F represents a factor of the titrant, and W represents the sampling amount (g) of the sample.

(5) Graft Amount of (Meth)Acrylic Acid Long-Chain Alkyl Ester

First, using a twin-screw extruder which is the same as in Production Example 1, each (meth)acrylic acid long-chain alkyl ester (concentration (% by mass): $C_1$, $C_2$ or $C_3$) which is a raw material of each of the reaction products A1 to A3 was mixed with each polyolefin which is a raw material of each of the reaction products A1 to A3. Thereafter, a hot press was used to obtain three kinds of films (thickness: 100 μm) that are different in the concentration of the (meth) acrylic acid long-chain alkyl ester from each other.

An infrared absorption spectrum of each of the three kinds of films was measured by Fourier-transform infrared spectroscopy, an absorbance ratio $Y_1$, $Y_2$ or $Y_3$ was determined in accordance with the following equation, and a calibration curve against the concentration $C_1$, $C_2$ or $C_3$ was prepared.

$$\text{Absorbance ratio } Y = \frac{\text{Absorbance derived from ester carbonyl stretching vibration } (1{,}730 \pm 10 \text{ cm}^{-1})}{\text{Absorbance derived from C—H bending vibration of CH}_3 \ (1{,}380 \pm 10 \text{ cm}^{-1})}$$

$Y_1$: Y in the case of concentration C1
$Y_2$: Y in the case of concentration C2
$Y_3$: Y in the case of concentration C3

Subsequently, the infrared spectrum of each of the reaction products A1 to A3 was measured, and the absorbance ratio $Y_{A1}$ (Y of the reaction product A1), $Y_{A2}$ (Y of the reaction product A2) or $Y_{A3}$ (Y of the reaction product A3) was determined. Then, the graft amount of the (meth)acrylic acid long-chain alkyl ester in each of the reaction products A1 to A3 was calculated based on each calibration curve prepared above and in accordance with each of the following equations:

Graft amount in A1 (% by mass)=$(Y_{A1}-b)/a$

Graft amount in A2 (% by mass)=$(Y_{A2}-b)/a$

Graft amount in A3 (% by mass)=$(Y_{A3}-b)/a$ $a=(3f-d\times e)/(3c-d^2)$ $b=(c\times e-f\times d)/(3c-d^2)$ $c=C_1^2+C_2^2+C_3^2$ $d=C_1+C_2+C_3$ $e=Y_1+Y_2+Y_3$ $f=C_1Y_1+C_2Y_2+C_3Y_3$.

(6) Content and Average Number of Functional Groups of (Meth)acryloyl Group Using an $^1$H-NMR analyzer, the content of the (meth)acryloyl group was determined from Mn and the ratio of a peak area derived from the polypropylene-based resin that appears in the vicinity of from 0.1 ppm to 2.3 ppm and a peak area derived from the (meth) acryloyl group that appears in the vicinity of from 6.0 ppm to 6.5 ppm, and the content and the average number of functional groups were calculated in accordance with the following equations, respectively.

Content (%)=Mh×(Aa/Ap)/Mha×Mna/Mn×100

Average number of functional groups=Mw×(content (%)/100)/Mna

Symbols in the above described equations are defined as follows. Mh: number of hydrogen atoms in repeating units=(Mhp×Mp+Mhe×Me+Mhb×Mb)/100
Ap: sum of peak areas derived from polypropylene-based resin (number of corresponding hydrogen atoms: Mh)
Aa: peak area derived from acryloyl group (number of corresponding hydrogen atoms: 1)
Mna: chemical formula weight of acryloyl group
Mn: chemical formula weight of repeating units=Mnp×Mp+Mne×Me+Mnb×Mb)/100
Mw: molecular weight of polypropylene-based resin Mp: mol % of propylene units included in polypropylene-based resin
Me: mol % of ethylene units included in polypropylene-based resin
Mb: mol % of butene units included in polypropylene-based resin
Mnp: chemical formula weight of propylene unit
Mne: chemical formula weight of ethylene unit
Mnb: chemical formula weight of butene unit
Mhp: number of hydrogen atoms in propylene unit=6
Mhe: number of hydrogen atoms in ethylene unit=4
Mhb: number of hydrogen atoms in butene unit=8
Mha: number of hydrogen atoms in acryloyl group=1

(7) Bonding Rate of (Meth)Acryloyl Group

The bonding rate of the (meth)acryloyl groups to the carboxyl groups derived from at least one of the acidic group or the acid anhydride group of the above described modified polypropylene-based resin, was calculated in accordance with the following equation:

$$K=(D-B)\times 56.1 \times 100{,}000/M/N/L$$

Symbols in the above described equations are defined as follows.
B: remaining weight (g) of (meth)acryloyl derivative determined by gas chromatography
D: addition weight (g) of (meth)acryloyl derivative
M: molecular weight of (meth)acryloyl derivative
L: acid value (mg KOH/g) of modified polypropylene-based resin
K: proportion (%) of carboxyl groups to which (meth)acryloyl derivative is bonded, with respect to carboxyl groups included in modified polypropylene-based resin
N: addition weight (g) of modified polypropylene-based resin a photoradical polymerization initiator (trade name: "IRGACURE 184", manufactured by BASF), dibutyl tin dilaurate (trade name: "ADEKASTAB BT-11", manufactured by ADEKA Corporation), as a curing catalyst, and an isocyanurate product (product name: "DURANATE TPA-100", manufactured by Asahi Kasei Corporation) of hexamethylene diisocyanate (containing a hydrocarbon group having 6 carbon atoms), as an isocyanate compound, were added in the proportions shown in the following Table 2, and the resultant was sufficiently mixed to obtain each of adhesive compositions according to Examples 6 to 10.

Comparative Examples 1 to 5

Into a flask which is the same as in Examples 1 to 5, any one of the reaction products A6 to A10, dibutyl tin dilaurate (trade name: "ADEKASTAB BT-11", manufactured by ADEKA Corporation), as a curing catalyst, and an isocyanurate product (product name: "DURANATE TPA-100", manufactured by Asahi Kasei Corporation) of hexamethylene diisocyanate (containing a hydrocarbon group having 6 carbon atoms), as an isocyanate compound, were added in the proportions shown in the following Table 2, and the resultant was sufficiently mixed to obtain each of adhesive compositions according to Comparative Examples 1 to 5.

Using each of the obtained adhesive compositions according to Examples 1 to 10 and Comparative Examples 1 to 5, the evaluation to be described later was carried out. In the preparation of a test piece to be described later, each of the adhesive compositions according to Examples 6 to 10 and Comparative Examples 1 to 5 was used within one hour after the addition of the isocyanate compound.

These results are shown in Table 2.

TABLE 1

| | | Weight average molecular weight | Melting point (° C.) | Energy of fusion (J/g) | Graft amount of acid anhydride group (% by weight) | Graft amount of (meth)acrylic acid long-chain alkyl ester (% by weight) | Content of (meth)acryloyl group (% by weight) | Average number of functional groups of (meth)acryloyl group | Bonding rate of (meth)acryloyl group (%) |
|---|---|---|---|---|---|---|---|---|---|
| Production Example 1 | A1 | 92,000 | 90 | 45 | 1.8 | 3.6 | 0.9 | 15 | 50 |
| Production Example 2 | A2 | 150,000 | 85 | 38 | 1.2 | 2.8 | 0.6 | 16 | 33 |
| Production Example 3 | A3 | 100,000 | 72 | 35 | 7.5 | 4.6 | 4.4 | 64 | 50 |
| Production Example 4 | A4 | 130,000 | 92 | 48 | 2.2 | 0.0 | 1.2 | 28 | 50 |
| Production Example 5 | A5 | 150,000 | 95 | 48 | 1.1 | 0.0 | 1.2 | 33 | 50 |

3. Preparation of Adhesive Compositions

1) Examples 1 to 5

Into a 300 mL flask equipped with a condenser and a stirrer, any one of the reaction products A1 to A5 as the component (A), and a photoradical polymerization initiator (trade name: "IRGACURE 184", manufactured by BASF), were added in the proportions shown in the following Table 2, and the resultant was sufficiently mixed to obtain each of adhesive compositions according to Examples 1 to 5. It is noted that the numerical values in Table 2 are indicated in parts by mass.

2) Examples 6 to 10

Into a flask which is the same as in Examples 1 to 5, any one of the reaction products A1 to A5, as the component (A), 4. Method of Evaluating Adhesive Compositions (1) Viscosity The viscosity was measured at a temperature of 25° C.±0.5° C., using a type B rotational viscometer (manufactured by Toki Sangyo Co., Ltd.). The results are shown in Table 2.

5. Preparation of Test Piece

Each of the adhesive compositions was applied onto an aluminum foil (size: 100 mm×200 mm, thickness: 40 μm, surface treatment: chemical treatment) sing a bar coater. Thereafter, the resultant was dried at 80° C. for 60 seconds to remove the organic solvent contained in the adhesive composition, to form an adhesive layer having a thickness of 4 μm.

Subsequently, a non-stretched polypropylene film (thickness: 80 μm, surface treatment: corona treatment, hereinafter, referred to as "CPP"), as a heat fusible resin film, was affixed on a surface of the adhesive layer, and thermocompression-bonded using a heat laminator with a rubber roll. At this time, the adhesion was carried out under the conditions of a roll surface temperature of 80° C., a roll pressure of 0.3 MPa, and a laminating rate of 1 m/min. Thereafter, an ultraviolet ray in the UV-A region was irradiated at 2,000 mJ/cm$^2$ from the CPP surface side, using a conveyor type ultraviolet ray irradiation apparatus (a 100 W/cm metal halide lamp, lamp height: 29 cm, irradiation intensity in the UV-A region: 250 mW/cm$^2$ (measurement value obtained by UV POWER PUCK, manufactured by Heraeus GmbH)) manufactured by EYE Graphics Co., Ltd. The resultant was left to stand under the predetermined aging conditions shown in Table 2, and then subjected to evaluation.

6. Evaluation of Test Pieces

Each of the test pieces obtained in the above section 5 was used to carry out the evaluation described below.

(1) Adhesiveness

[Peel Strength at Normal Temperature]

Each of the test pieces was cut into a width of 15 mm, and the peel strength at normal temperature (measurement temperature: 25° C.) between the aluminum foil and the CPP was measured by a T-peel test (tensile rate: 100 mm/min). The results thereof are shown in Table 2.

[Peel Strength at High Temperature]

Each of the test pieces was cut into a width of 15 mm, and the peel strength at a high temperature (measurement temperature: 80° C.) between the aluminum foil and the CPP was measured by a T-peel test (tensile rate: 100 mm/min). The results thereof are shown in Table 2.

(2) Electrolyte Resistance

Ethylene carbonate, diethyl carbonate, and dimethyl carbonate were mixed at a ratio of 1:1:1 (weight ratio). To the resulting mixture, lithium hexafluorophosphate was added at a concentration of 1 mol/L, to be used as an electrolyte.

Each of the test pieces was immersed in the electrolyte at a temperature of 80° C. for 8 days, and thereafter, the peel strength at normal temperature (measurement temperature: 25° C.) between the aluminum foil and the CPP was measured by a T-peel test (tensile rate: 100 mm/min). The results thereof are shown in Table 2.

TABLE 2

| Component | | | | Examples | | | | | | |
|---|---|---|---|---|---|---|---|---|---|---|
| | | | | 1 | 2 | 3 | 4 | 5 | 6 | 7 |
| A1 | | | (g) | 100 | | | | | 100 | |
| A2 | | | (g) | | 100 | | | | | 100 |
| A3 | | | (g) | | | 100 | | | | |
| A4 | | | (g) | | | | 100 | | | |
| A5 | | | (g) | | | | | 100 | | |
| A6 | | | (g) | | | | | | | |
| A7 | | | (g) | | | | | | | |
| A8 | | | (g) | | | | | | | |
| A9 | | | (g) | | | | | | | |
| A10 | | | (g) | | | | | | | |
| Photoradical polymerization initiator | | | (g) | 0.15 | 0.15 | 0.15 | 0.15 | 0.15 | 0.15 | 0.15 |
| Curing catalyst | | | (mg) | | | | | | 1.5 | 1.5 |
| Isocyanate compound | | | (g) | | | | | | 1.0 | 1.0 |
| Equivalence ratio (NCO/OH) | | | | | | | | | 2.1 | 2.4 |
| Viscosity of solution | | | mPa · s | 232 | 187 | 141 | 854 | 827 | 241 | 193 |
| Adhesiveness | Peel strength at normal temperature | Aging conditions | | 25° C. × 30 min | | | | | | |
| | | T-peel strength (25° C.) | (N/15 mm) | 3.5 | 2.7 | 2.5 | 3.0 | 2.9 | 3.4 | 2.6 |
| | Peel strength at high temperature | Aging conditions | | 40° C. × 7 days | | | | | | |
| | | T-peel strength (80° C.) | (N/15 mm) | 2.7 | 2.1 | 2.2 | 2.5 | 2.2 | 10.2 | 9.7 |
| Electrolyte resistance | | Aging conditions | | 40° C. × 7 days | | | | | | |
| | | T-peel strength (25° C.) after immersion | (N/15 mm) | 2.8 | 2.0 | 2.0 | 2.3 | 2.1 | 14.1 | 12.5 |

| Component | | | | Examples | | | Comparative Examples | | | | |
|---|---|---|---|---|---|---|---|---|---|---|---|
| | | | | 8 | 9 | 10 | 1 | 2 | 3 | 4 | 5 |
| A1 | | | (g) | | | | | | | | |
| A2 | | | (g) | | | | | | | | |
| A3 | | | (g) | 100 | | | | | | | |
| A4 | | | (g) | | 100 | | | | | | |
| A5 | | | (g) | | | 100 | | | | | |
| A6 | | | (g) | | | | 100 | | | | |
| A7 | | | (g) | | | | | 100 | | | |
| A8 | | | (g) | | | | | | 100 | | |
| A9 | | | (g) | | | | | | | 100 | |
| A10 | | | (g) | | | | | | | | 100 |
| Photoradical polymerization initiator | | | (g) | 0.15 | 0.15 | 0.15 | | | | | |
| Curing catalyst | | | (mg) | 1.5 | 1.5 | 1.5 | 1.5 | 1.5 | 1.5 | 1.5 | 1.5 |
| Isocyanate compound | | | (g) | 1.0 | 1.0 | 1.0 | 1.5 | 1.5 | 1.5 | 1.5 | 1.5 |
| Equivalence ratio (NCO/OH) | | | | 0.6 | 1.7 | 3.3 | 1.5 | 2.4 | 0.4 | 1.3 | 2.5 |
| Viscosity of solution | | | mPa · s | 145 | 893 | 833 | 178 | 179 | 136 | 824 | 835 |
| Adhesiveness | Peel strength at normal temperature | Aging conditions | | 25° C. × 30 min | | | 25° C. × 30 min | | | | |
| | | T-peel strength (25° C.) | (N/15 mm) | 2.7 | 3.2 | 3.0 | 0.4 | 0.3 | 0.5 | 0.3 | 0.3 |

| | | | 40° C. × 7 days | | | | 40° C. × 7 days | | | |
|---|---|---|---|---|---|---|---|---|---|---|
| Peel strength at high temperature | Aging conditions T-peel strength (80° C.) | (N/15 mm) | 9.8 | 10.5 | 9.7 | 9.7 | 9.5 | 9.1 | 9.4 | 9.1 |
| Electrolyte resistance | Aging conditions T-peel strength (25° C.) after immersion | (N/15 mm) | 40° C. × 7 days | | | | 40° C. × 7 days | | | |
| | | | 12.1 | 14.7 | 13.2 | 12.4 | 11.7 | 11.5 | 13.1 | 12.3 |

7. Evaluation Results

As is evident from Table 2, each of the adhesive compositions of Examples 1 to 10 had a high peel strength at normal temperature, as measured after being left at 25° C. for 30 minutes after lamination, of 2.5 N/15 mm or more, revealing that each of the adhesive compositions showed an excellent rise in the peel strength after lamination, and exhibited excellent adhesiveness even with a short aging time. Each of the adhesive compositions of Examples 1 to 10 also had a high peel strength at a high temperature, as measured after being aged at 40° C. for 7 days, of 2.0 N/15 mm or more, revealing that each of the adhesive compositions exhibited excellent adhesiveness and heat resistance, and also had an excellent electrolyte resistance.

In contrast, each of the adhesive compositions of Comparative Examples 1 to 5 had an insufficient peel strength at normal temperature, as measured after being left at 25° C. for 30 minutes after lamination.

INDUSTRIAL APPLICABILITY

The present invention relates to an adhesive composition, as well as to a material for a battery, a material for a lithium ion battery, a heat fusible member, and a packaging material for a lithium ion battery, each using the same. The present invention can be used in the fields of various industrial products, such as the fields of electrical devices, automobiles and industries, and belongs to these technical fields.

DESCRIPTION OF REFERENCES

1 Heat fusible member
11 Heat fusible resin layer
12 Adhesive layer
13 Metal layer
14 Other layer

What is claimed is:
1. An adhesive composition, comprising:
a modified polypropylene-based resin (A) that contains at least one of an acidic group or an acid anhydride group, and that contains a (meth)acryloyl group (a) represented by the following Formula (I); and
an organic solvent, wherein the modified polypropylene-based resin (A) is dissolved in the organic solvent with the modified polypropylene-based resin (A) being 5% by mass to 25% by mass with respect to 100% by mass of the total amount of the organic solvent and the modified polypropylene-based resin (A),
wherein the (meth)acryloyl group (a) is introduced by a modification reaction of at least one of an acidic group or an acid anhydride group of a polypropylene-based resin (b) that contains the at least one of the acidic group or the acid anhydride group:

$$CH_2=CR^1CO- \tag{I}$$

wherein, in Formula (I), $R^1$ represents a hydrogen atom or a methyl group.

2. The adhesive composition according to claim 1, wherein the (meth)acryloyl group (a) is introduced by a reaction of the at least one of the acidic group or the acid anhydride group of the polypropylene-based resin (b), with a compound represented by the following Formula (II):

$$CH_2=CR^2CO-R^3-OH \tag{II}$$

wherein, in Formula (II), $R^2$ represents a hydrogen atom or a $CH_3$ group; $R^3$ represents a $-(OCH_2CH_2)_n-$ group, wherein n represents an integer from 1 to 8, a $-(OCH_2CH(CH_3))_n-$ group, wherein n represents an integer from 1 to 8, a $-(OCH_2CH_2CH(CH_3))_n-$ group, wherein n represents an integer from 1 to 8, a $-(O(CH_2)_4)_n-$ group, wherein n represents an integer from 1 to 8, a $-(OCH_2CH(CH_2CH_3))_n-$ group, wherein n represents an integer from 1 to 8, or an $-NH-CH_2-$ group.

3. The adhesive composition according to claim 1, wherein the (meth)acryloyl group (a) is introduced by a reaction of the at least one of the acidic group or the acid anhydride group of the polypropylene-based resin (b), with a compound represented by the following Formula (III):

$$CH_2=CR^4CO-R^5-NCO \tag{III}$$

wherein, in Formula (III), $R^4$ represents a hydrogen atom or a $CH_3$ group; R represents a $-(OCH_2CH_2)_n-$ group, wherein n represents an integer from 1 to 8, a $-(OCH_2CH(CH_3))_n-$ group, wherein n represents an integer from 1 to 8, or an $-NH-CH_2-$ group.

4. The adhesive composition according to claim 1, wherein the (meth)acryloyl group (a) is introduced by a reaction of the at least one of the acidic group or the acid anhydride group of the polypropylene-based resin (b), with a compound represented by the following Formula (IV):

$$CH_2=CR^6CO-R^7-OR^{10} \tag{IV}$$

wherein, in Formula (IV), $R^6$ represents a hydrogen atom or a $CH_3$ group; $R^7$ represents a single bond, a $-(OCH_2CH_2)_n-$ group, wherein n represents an integer from 1 to 8, a $-(OCH_2CH(CH_3))_n-$ group, wherein n represents an integer from 1 to 8, or an $-NH-CH_2-$ group; and $R^{10}$ represents a glycidyl group.

5. The adhesive composition according to claim 1, wherein the (meth)acryloyl group (a) is introduced by a reaction of:
at least one of a hydroxyl group or a carboxy group, which is produced by a reaction of the at least one of the acidic group or the acid anhydride group of the polypropylene-based resin (b) with at least one of a compound represented by the following Formula (V) or a compound represented by the following Formula (VI), with a compound represented by the following Formula (VII):

$$H_2N-(CH_2)_n-OH \tag{V}$$

wherein, in Formula (V), n represents an integer from 1 to 8;

(VI)

wherein, in Formula (VI), each of m and n independently represents an integer from 1 to 8;

(VII)

wherein, in Formula (VII), $R^8$ represents a hydrogen atom or a $CH_3$ group; $R^9$ represents a $-(OCH_2CH_2)_n-$ group, wherein n represents an integer from 1 to 8, a $-(OCH_2CH(CH_3))_n-$ group, wherein n represents an integer from 1 to 8, or an $-NH-CH_2-$ group.

6. The adhesive composition according to claim 1, further comprising a radical polymerization initiator.

7. The adhesive composition according to claim 1, further comprising an isocyanate compound.

8. The adhesive composition according to claim 1, wherein the modified polypropylene-based resin (A) has an average molecular weight of 92,000 or more.

9. The adhesive composition according to claim 1, wherein the content of the modified polypropylene-based resin (A) is from 90% by mass to 100% by mass with respect to 100% by mass of the solid content of the adhesive composition.

* * * * *